United States Patent
Dumitrescu et al.

(10) Patent No.: US 9,450,881 B2
(45) Date of Patent: Sep. 20, 2016

(54) METHOD AND SYSTEM FOR TRAFFIC METERING TO LIMIT A RECEIVED PACKET RATE

(71) Applicants: Cristian Florin Dumitrescu, Shannon (IE); Andrey Chilikin, Shannon (IE); Pierre Laurent, Quin (IE); Kannan Babu Ramia, Chandler, AZ (US); Sravanthi Tangeda, Hillsboro, OR (US)

(72) Inventors: Cristian Florin Dumitrescu, Shannon (IE); Andrey Chilikin, Shannon (IE); Pierre Laurent, Quin (IE); Kannan Babu Ramia, Chandler, AZ (US); Sravanthi Tangeda, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 14/142,253

(22) Filed: Dec. 27, 2013

(65) Prior Publication Data

US 2015/0016266 A1     Jan. 15, 2015

Related U.S. Application Data

(60) Provisional application No. 61/844,230, filed on Jul. 9, 2013.

(51) Int. Cl.
| | |
|---|---|
| *H04L 12/873* | (2013.01) |
| *H04L 12/815* | (2013.01) |
| *H04L 12/863* | (2013.01) |
| *H04L 12/819* | (2013.01) |
| *H04L 12/54* | (2013.01) |
| *H04L 12/801* | (2013.01) |
| *H04L 12/813* | (2013.01) |

(52) U.S. Cl.
CPC .......... *H04L 47/527* (2013.01); *H04L 12/5693* (2013.01); *H04L 47/10* (2013.01); *H04L 47/20* (2013.01); *H04L 47/21* (2013.01); *H04L 47/215* (2013.01); *H04L 47/22* (2013.01); *H04L 47/623* (2013.01); *H04L 47/6255* (2013.01)

(58) Field of Classification Search
CPC .......................... H04L 47/527; H04L 47/6255
See application file for complete search history.

(56) References Cited

U.S. PATENT DOCUMENTS

| | | | |
|---|---|---|---|
| 7,653,069 B2 * | 1/2010 | Lakshmanamurthy et al. | 370/395.4 |
| 8,032,653 B1 * | 10/2011 | Liu et al. | 709/235 |
| 2002/0097677 A1 * | 7/2002 | Hoar et al. | 370/230 |
| 2003/0076848 A1 * | 4/2003 | Bremler-Barr et al. | 370/412 |
| 2007/0171929 A1 * | 7/2007 | Kim et al. | 370/412 |

\* cited by examiner

*Primary Examiner* — Ian N Moore
*Assistant Examiner* — Mewale Ambaye
(74) *Attorney, Agent, or Firm* — Grossman, Tucker, Perreault & Pfleger, PLLC

(57) ABSTRACT

One embodiment provides a network device. The network device includes a a processor including at least one processor core; a network interface configured to transmit and receive packets at a line rate; a memory configured to store a scheduler hierarchical data structure; and a scheduler module. The scheduler module is configured to prefetch a next active pipe structure, the next active pipe structure included in the hierarchical data structure, update credits for a current pipe and an associated subport, identify a next active traffic class within the current pipe based, at least in part, on a current pipe data structure, select a next queue associated with the identified next active traffic class, and schedule a next packet from the selected next queue for transmission by the network interface if available traffic shaping token bucket credits and available traffic class credits are greater than or equal to a next packet credits.

18 Claims, 18 Drawing Sheets

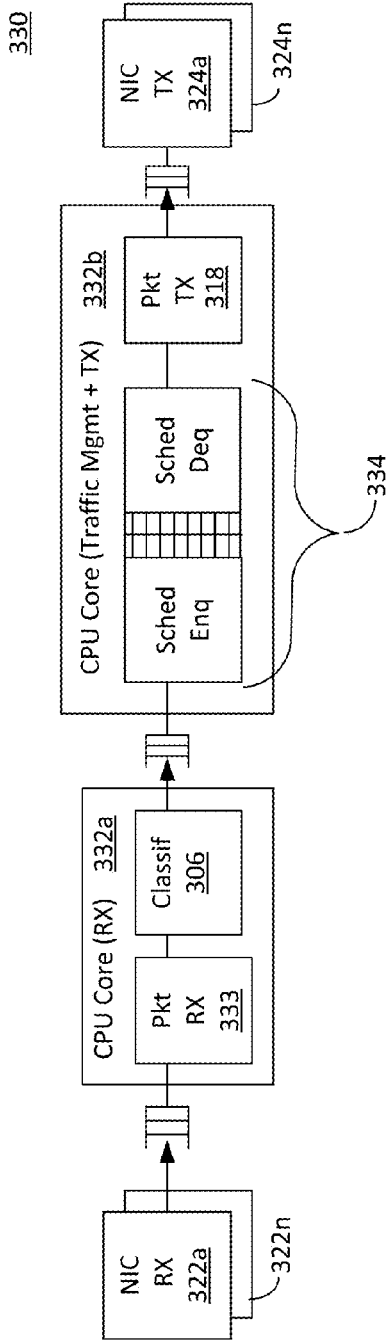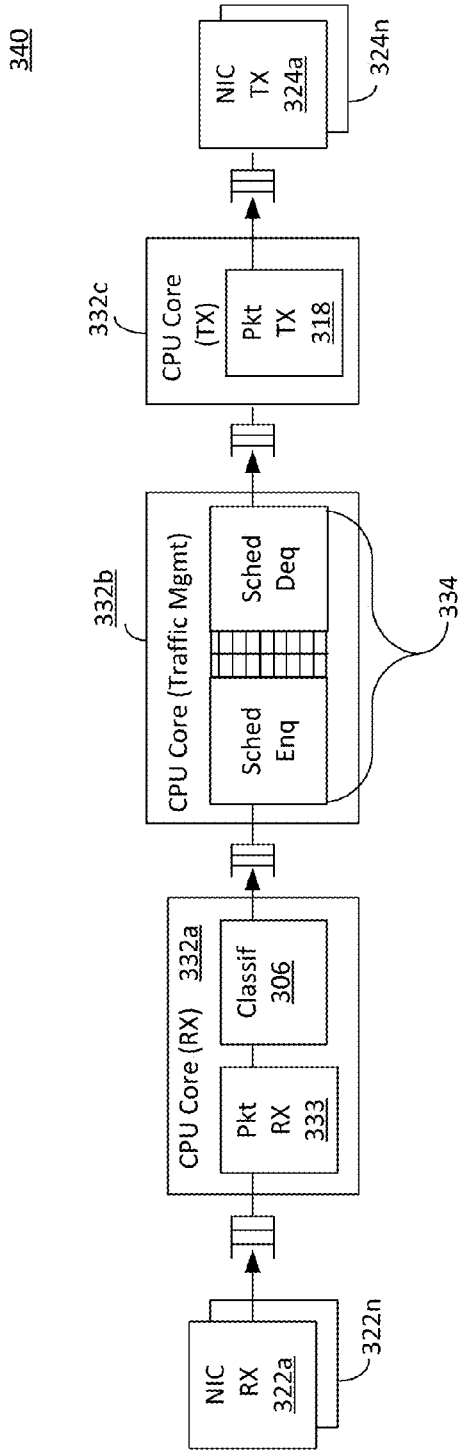

__US 9,450,881 B2__

METHOD AND SYSTEM FOR TRAFFIC METERING TO LIMIT A RECEIVED PACKET RATE

CROSS-REFERENCE TO RELATED APPLICATION(S)

This application claims the benefit of U.S. Provisional Application No. 61/844,230, filed Jul. 9, 2013, the teachings of which are incorporated herein by reference in their entirety.

FIELD

This disclosure relates to traffic management, and, more particularly, to traffic management with ingress control.

BACKGROUND

Generally, a service provider network is configured to provide network connectivity to thousands of users. The users may include individuals and/or enterprises that couple to the provider network via respective network nodes. The user side of each network node may include one or more user devices (e.g., computing devices, telephones, audio visual equipment, etc.) that may be interconnected via a user network.

The user devices are configured to transmit and/or receive network traffic that includes voice, video, and/or data. An amount of traffic between a respective user and the provider network may be defined for each network node by, e.g., a Service Level Agreement (SLA). The SLA may include, e.g., data rate and/or traffic volume constraints and/or commitments that are defined per user and/or by traffic type (i.e., traffic class).

The provider network includes a plurality of network devices, e.g., routers, configured to manage travel of network traffic over the provider network. Each network device is configured to receive and/or transmit a plurality of traffic flows. Network device physical resources, e.g., ports, are thus shared by the plurality of traffic flows.

Traffic management is configured to manage the sharing of the ports by the traffic flows. Traffic management is configured to select, i.e., schedule, packets for transmission with scheduling decisions based, at least in part, on traffic classes associated with the traffic flows. Conventional traffic management has typically been implemented in dedicated hardware that is optimized for packet processing. The dedicated hardware may not be programmable by the service provider and/or may present interoperability challenges if network devices from more than one vendor are used together.

Traffic metering is configured to limit a received packet rate. Conventional traffic metering has typically been implemented in dedicated hardware. Metering accuracy in a network device may typically be achieved with such hardware for either relatively small bandwidth flows or relatively high bandwidth (e.g., at or near line rate) flows but not both.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 3C illustrates an example of mapping some packet processing pipeline functional blocks to a plurality of processor cores;

FIG. 3D illustrates another example of mapping some packet processing pipeline functional blocks to a plurality of processor cores;

Although the following Detailed Description will proceed with reference being made to illustrative embodiments, many alternatives, modifications, and variations thereof will be apparent to those skilled in the art.

DETAILED DESCRIPTION

Generally, this disclosure is related to traffic management with ingress control. A system and method consistent with the present disclosure is configured to provide programmable egress traffic management utilizing programmable network devices with line rates on the order of ones, tens or more gigabits per second. The system and method are configured to prioritize transmission of packets associated with a plurality of users and a plurality of traffic classes according to a policy specified by, e.g., a Service Level Agreement (SLA). The system and method are further configured to provide support for thousands (e.g., 64 k, where k is 1024) of packet queues (and packet flow(s) associated with each queue) and hierarchical scheduling with multiple scheduling levels (e.g., five). The system and method are configured to operate on a plurality of packets in parallel for enqueue operations and a plurality of pipes in parallel for dequeue operations, as described herein, thus, "hiding" prefetch latencies. In some embodiments, the system and method may include congestion detection mechanisms (e.g., tail drop, random early detection). The system and method are further configured to provide a relatively high level of accuracy for features such as traffic shaping, strict priority and weighted round robin, as described herein.

Similarly, ingress control consistent with the present disclosure is configured to be implemented on the programmable network device and is further configured to provide relatively high accuracy (e.g., on the order of 1%) for both relatively low bandwidth (e.g., on the order of Mbps (megabits per second)) and relatively high (e.g., on the order of Gbps (gigabits per second)) bandwidth packet flows.

Figure 1:
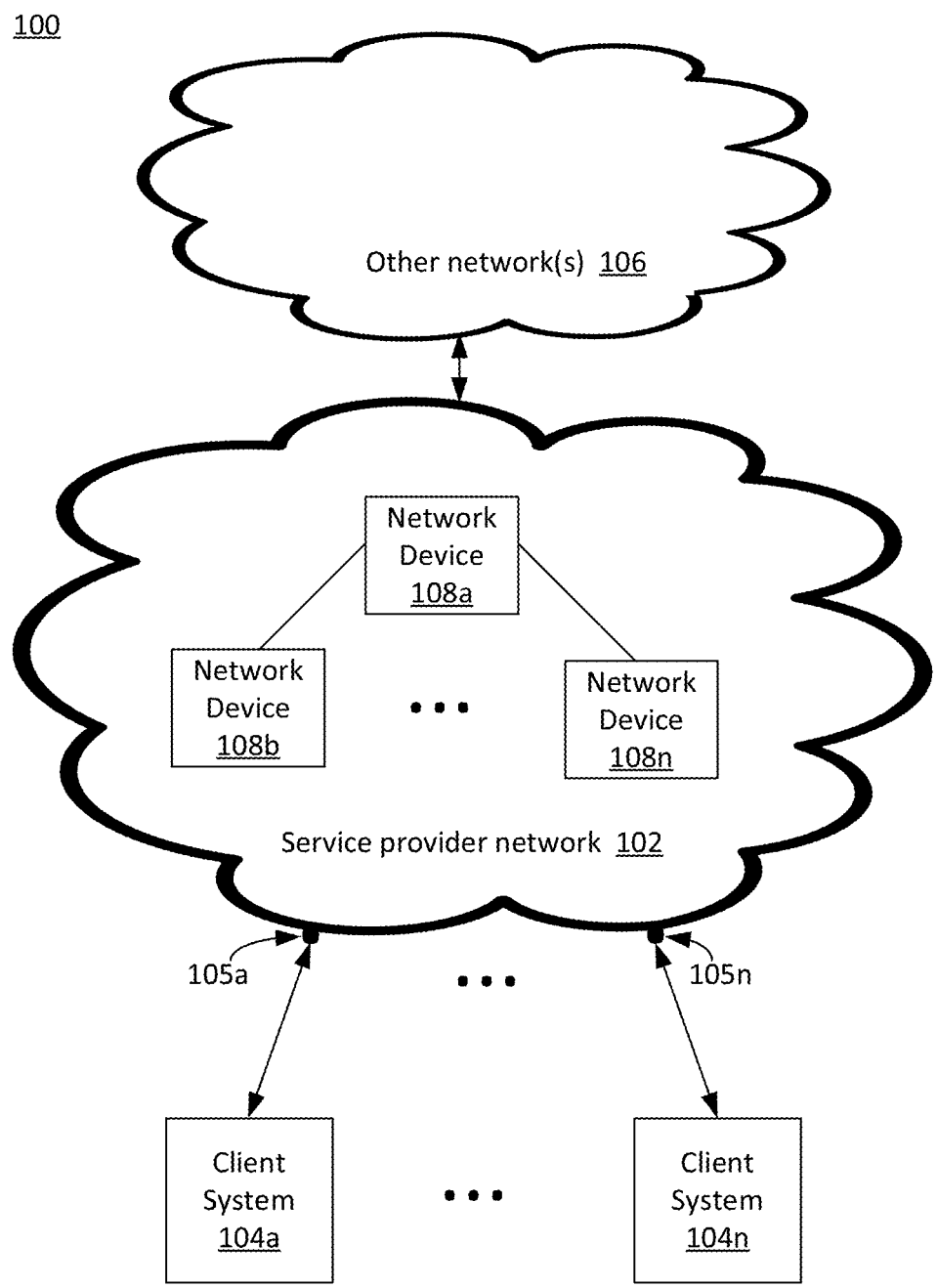
FIG. 1 illustrates an example network system consistent with various embodiments of the present disclosure.

FIG. 1 illustrates an example network system 100 consistent with various embodiments of the present disclosure. The system 100 generally includes a provider network 102, a plurality of client systems 104a, . . . , 104n coupled to the provider network 102 by respective network nodes 105a, . . . , 105n and one or more other network(s) 106. The provider network 102 is configured to provide networking services to the plurality of users, i.e., clients (e.g., subscribers, enterprises). The provider network 102 includes a plurality of network devices 108a, . . . , 108n. Each network device 108a, . . . , 108n is coupled to one or more other network device(s) 108a, . . . , 108n and at least one network device may be coupled to other network(s) 106. As used herein, network device includes, but is not limited to, a router, a switch and/or a hub.

Provider network 102 is configured to provide network connectivity and network service to each client system 104a, . . . , 104n. For example, a client system, e.g., client system 104a, may couple to other network(s) 106 and/or another client system 104b, . . . , 104n via provider network 102. Each client system may include one or more of a computer node element (e.g., host server system, desktop computer, laptop computer, tablet computer, etc.), switch, router, hub, network storage device, network attached device, non-volatile memory (NVM) storage device, cloud-based server and/or storage system, a blade, audiovisual equipment (e.g., television, radio receiver, etc.), a smartphone, a feature phone, etc. Each client system 104a, . . . , 104n is configured to transfer packets that include data) to and from provider network 102 via respective network nodes 105a, . . . , 105n. The packets include data that may include voice data, video data and/or other data, e.g., file transfer data.

The provider network 102 (including network device(s) 108a, . . . , 108n), the client system(s) 104a, . . . , 104n and/or other network(s) 106 may communicate with each other using a switched fabric communications protocol, for example, an Ethernet communications protocol, Infiniband communications protocol, etc. The Ethernet communications protocol may be capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard, for example, the IEEE 802.3 Standard for Ethernet, published 2012. The Infiniband protocol may comply or be compatible with the Infiniband specification published by the InfiniBand Trade Association (IBTA), titled "InfiniBand™ Architecture Specification", Volume 1, Release 1.2.1, published June 2001 and/or later versions of this specification, for example, InfiniBand Volume 1 (General Specification), Release 1.2.1, published January 2008 and Volume 2 (Physical Specification), Release 1.3, published November 2012. Of course, in other embodiments, the switched fabric communications protocol may include a custom and/or proprietary switched fabric communications protocol.

Network 102 and/or other network(s) 106 may include any packet-switched network such as, for example, Ethernet networks as set forth in the IEEE 802.3 standard and/or a wireless local area network such as, for example, IEEE 802.11 standard. The wireless protocol may comply or be compatible with the Wireless standard published by the IEEE titled "802.11-2012—IEEE Standard for Information technology—Telecommunications and information exchange between systems Local and metropolitan area networks—Specific requirements Part 11: Wireless LAN Medium Access Control (MAC) and Physical Layer (PHY) Specifications", published April 2012, and/or later versions of this standard.

Figure 2:
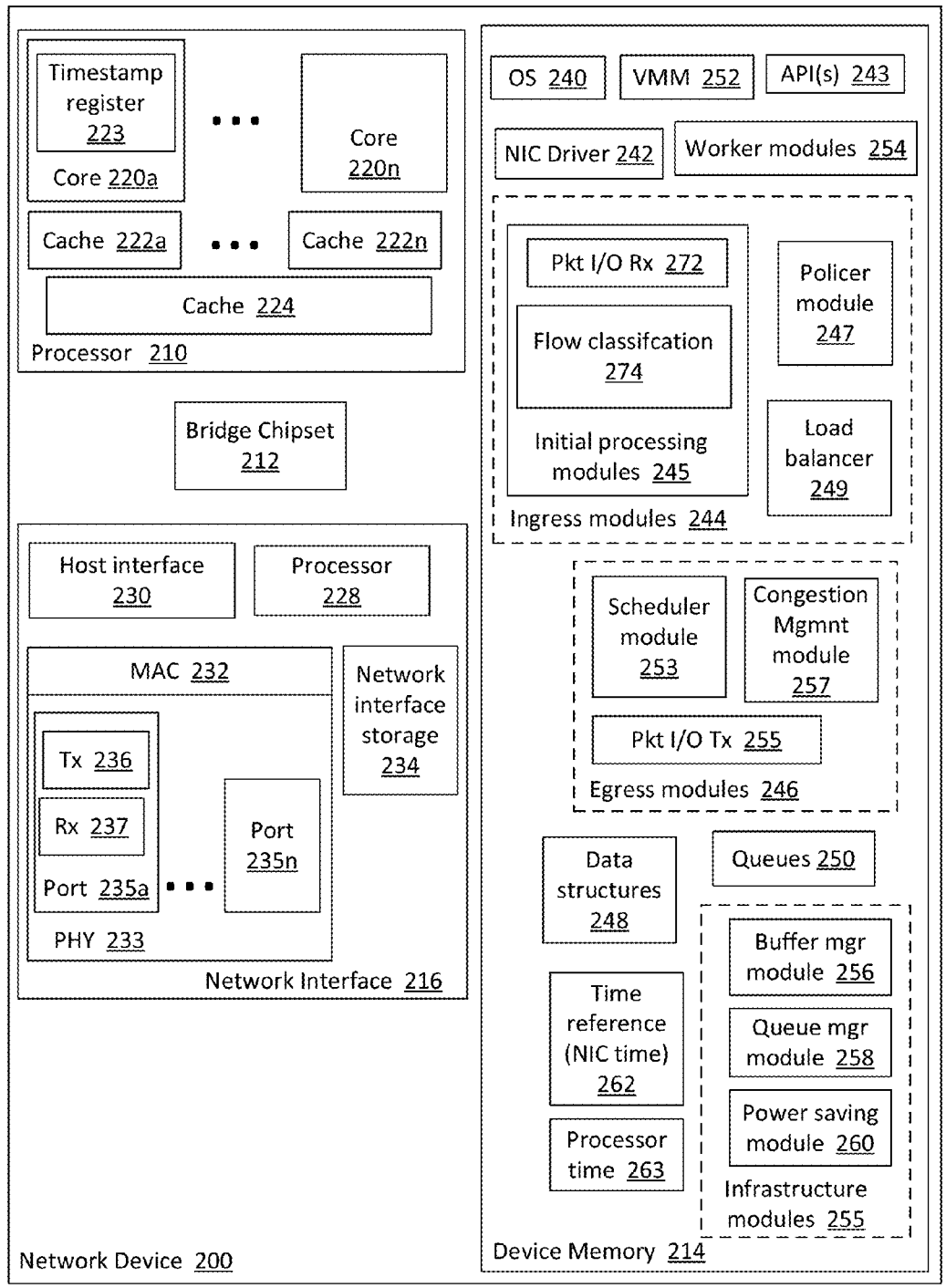
FIG. 2 illustrates an example network device consistent with various embodiments of the present disclosure.

FIG. 2 illustrates an example network device 200 consistent with various embodiments of the present disclosure. Network device 200 is one example of network devices 108a, . . . , 108n of FIG. 1. The network device 200 generally includes a processor 210, a bridge chipset 212, a system memory 214 and a network interface 216. The processor 210 is configured to perform operations associated with network device 200. Processor 210 may include one or more processing unit(s), e.g., core(s) 220a, . . . , 220n, a respective cache memory 222a, . . . , 222n associated with each core 220a, . . . , 220n and a processor cache memory 224. The bridge chipset 212 is configured to couple the processor 210, the system memory and/or the network interface 216.

Network interface 216 is configured to couple network device 200 to one or more other network device(s) 108a, . . . , 108n and/or to other network(s) 106. Network interface 216 may include a processor 228, host interface 230, media access control (MAC) circuitry 232, physical layer circuitry (PHY) 233 and network interface storage 234. Processor 228 is configured to perform operations associated with network interface 216. Host interface 230 is configured to couple network interface 216 to bridge chipset 212.

MAC 232 and PHY 233 are configured to couple network device 200 to one or more other network devices 108a, . . . , 108n and/or to other network(s) 106 via a physical medium. MAC 232 is configured to perform media access management for transmit and receive functions. PHY 233 includes one or more port(s) 235a, . . . , 235n with each port 235a, . . . , 235n capable of carrying a plurality of traffic flows, as described herein. Each port, e.g., port 235a, includes transmit circuitry 236 configured to transmit data and/or message packets and/or frames to one or more other network devices 108a, . . . , 108n and/or to other network(s) 106. Each port, e.g., port 235a, includes receive circuitry 237 configured to receive data and/or message packets and/or frames from the one or more other network devices 108a, . . . , 108n and/or to other network(s) 106.

System memory 214 may be configured to store an operating system OS 240, a network interface controller "NIC" driver 242, a plurality of application programming interfaces APIs 243, a plurality of ingress modules 244, a plurality of egress modules 246, a plurality of data structures 248 and a plurality of queues 250 configured store packets after packet processing and prior to transmission, as described herein.

System memory 214 may be configured to store a virtual machine monitor (VMM) 252 and may then include a plurality of virtual machines (not shown). OS 240 may be configured to utilize a software framework configured for efficient and relatively fast packet processing. For example, the software framework may comply or be compatible with the Intel® Data Plane Development Kit (DPDK) configured to optimize packet processing on Intel® Architecture processors.

Ingress modules 244 may include a plurality of initial processing modules 245, a Policer module 247 and a load balancer 249. Egress modules 246 may include a scheduler module 253 (e.g., a hierarchical scheduler) and a packet input/output (I/O) module 255. In some embodiments, egress modules 246 may include a congestion management module 257, as described herein. API(s) 243 may be configured to provide application programming interfaces for, e.g., scheduler module 253, and may include scheduler configuration, enqueue and/or dequeue functionality. API(s) 243 may be utilized by, e.g., a service provider to implement policies related to SLAs for each network node and associated user.

Network device 200 is configured to perform traffic management functions for network traffic carried by provider network 102. Network device 200 may receive a plurality of packets in a plurality of packet flows, e.g., by Rx 237 of port 235a, process the packets and transmit the processed packets by e.g., Tx 236 of port 235a. Initial processing modules 245 may include a packet I/O receive module 272 and a flow classification module 274 configured to process received packets to, for example, identify an associated traffic flow, identify a source and/or a destination, and/or identify a traffic class, as described herein. In some embodiments, Policer module 247 may be configured to limit the number of packets that may be further processed by network device 200, as describe herein. Load balancer 249 is configured to distribute packet processing activities across processor cores and/or across a plurality of threads.

Egress modules 246 are configured to manage transmission of processed packets from network device 200. Scheduler module 253 is configured to enqueue processed packets that are ready for transmission, select a next packet for transmission, and to dequeue the selected next packet(s). Pkt I/O Tx module 255 is configured to communicate to, e.g., network interface 216 that the dequeued packet(s) are ready for transmission. Congestion management module 257 is configured to selectively drop packets, based on policy, if more packets are received then may be transmitted in a time period.

Ingress modules 244 and egress modules 246 are configured to exploit processor 210 architecture. Ingress, egress and other packet processing functionality may be distributed between processor cores 220a, . . . , 220n and/or a plurality of threads. Thus, ingress, egress and/or other packet processing functions may be performed in parallel and may be pipelined. Pipelining is configured to increase packet processing efficiency and may facilitate processing a relatively large number (e.g., tens of thousands or more) of packet flows in a relatively short period of time.

Figure 3A:
FIG. 3A illustrates an example sequence of packet processing pipeline functional blocks for one packet processing pipeline.

FIG. 3A illustrates an example sequence of packet processing pipeline functional blocks for one packet processing pipeline 300. Network device 200 may be configured to implement a plurality of packet processing pipelines. The functional blocks of packet processing pipeline 300 may be performed by one or more cores 220a, . . . , 220n of processor 210 and/or network interface 216. Packet processing pipeline 300 includes packet input/output receive module "Pkt I/O Rx" 302, a packet parser module "Pkt parse" 304 and a flow classifier module "Classif" 306. For example, Pkt I/O Rx 302, Pkt parse 304 and Classif 306 may be included in the initial processing modules 245 of FIG. 2. Packet processing pipeline 300 further includes a traffic metering and/or policing module "Policer" 308, a load balancing module "Load balancer" 310, a worker module "Worker" 312, a congestion management module "Dropper" 314, a hierarchical scheduler module "Hier sched" 316 and a packet input/output transmit module "Pkt I/O Tx" 318. For example, Policer 308 may correspond to Policer 247, the Load balancer 310 may correspond to Load balancer 249, Worker 312 may correspond to worker module(s) 254, Dropper 314 may correspond to congestion management module 257, Hier sched 316 may correspond to scheduler module 253 and Pkt I/O Tx 318 may correspond to Pkt I/O Tx 255.

Input packets may be received from Rx 237 by Pkt I/O Rx 302 and processed packets may be transmitted by Tx 236 in response to notification from Pkt I/O Tx 318. Generally, each packet includes a packet header associated with routing (e.g., addressing) and control and a packet payload that includes data. Packets may be received by, e.g., Rx 237 of port 235a of network interface 216 and may be initially processed by NIC driver 242. For example, NIC driver 242 may be configured as a poll mode driver, as described herein. Received packets (i.e., input packets) may then be parsed by Pkt parse 304. Pkt parse 304 is configured to identify a protocol stack of each input packet. Pkt parse 304 is further configured to check integrity of the packet headers of the input packets. Input packets may then be mapped to a traffic flow by Classif 306. For example, mapping may include exact match table lookup using configurable hash functions (e.g., jhash, CRC (Cyclic Redundancy check), etc.) and bucket logic to manage collisions. Each traffic flow corresponds to a type of packets transferring between a source and a destination. Sources and/or destinations may include, e.g., client system(s) 104a, . . . , 104n (and/or client device(s) within the client systems), provider network 102, other network(s) 106 and/or other client systems (not shown) coupled to other network(s) 106. The type of packets may correspond to a type of payload e.g., voice, video, data, carried by the packet and may further correspond to traffic class.

Policer 308 is configured to perform traffic metering and/or policing functions, as described herein. Traffic metering and/or policing is configured to limit a data rate, as described herein. One or more input packets may be dropped as a result of traffic metering and/or policing. Load balancer 310 is configured to distribute input packets (that have survived metering/policing) to a plurality of worker modules, e.g. worker 312, and to provide a uniform load to each worker module. Each worker module, e.g., worker 312, may correspond to a service provider specific application workload thread (e.g., internet protocol (IP) stack, etc.). Load balancer 310 may be further configured preserve the affinity of traffic flows to the worker modules and the packet order within each flow. Preserving affinity of traffic flows to worker modules may be configured to support efficient packet processing by exploiting data locality while processing a packet flow.

Dropper 314 is configured to perform congestion management for hierarchical scheduler 316, as described herein. Congestion management may include dropping packets whenever a target scheduler queue is full until a number of packets have been sent from the target egress queue, Random Early Detection (RED) and/or Weighted RED (WRED). Weighted RED is configured to drop packets based on a current scheduler queue load level and packet priority. Thus, when congestion is experienced, relatively lower priority packets may be dropped before relatively higher priority packets.

The hierarchical scheduler module 316 is configured to schedule (i.e., select) a next packet for transmission based, at least in part, on a number of criteria, as described herein. The hierarchical scheduler 316 is configured to enqueue packets in a plurality of queues to await transmission and to dequeue the packets when selected for transmission. The hierarchical scheduler module 316 may be configured to implement traffic shaping, strict priority, upper limit enforcement and/or weighted round robin. The hierarchical scheduler module 316 is configured to manage on the order of thousands of queues, as described herein.

Network device 200 may further include a plurality of infrastructure modules 255 configured to support packet processing pipeline 300 functionality. Infrastructure modules 255 include a buffer manager module 256 configured to provide support for global buffer pools and private per-thread buffer caches, a queue manager module 258 configured to provide support for message passing between packet processing pipeline modules and/or a power saving module 260 configured to provide support for power saving during low activity periods.

Figure 3B:
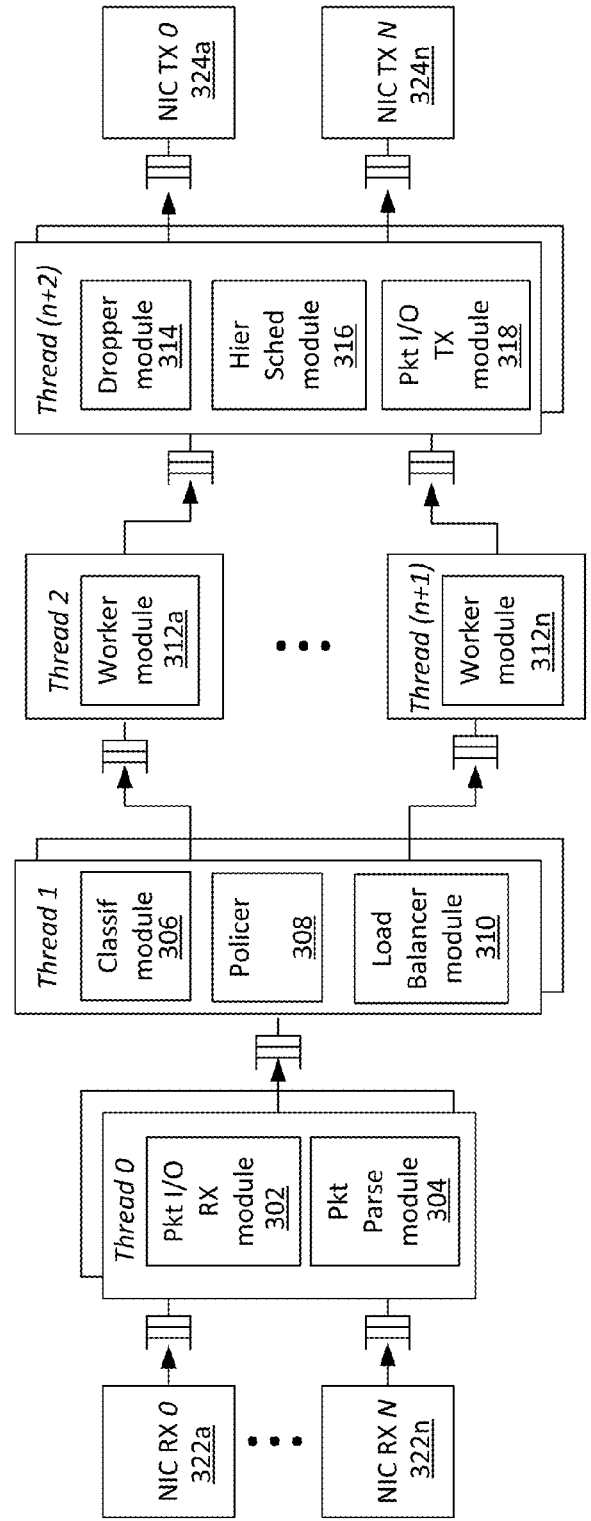
FIG. 3B illustrates one example of mapping the functional blocks of packet processing pipeline of FIG. 3A to a plurality of threads.

FIG. 3B illustrates one example 320 of mapping the functional blocks of packet processing pipeline 300 to a plurality of threads. The threads may be configured to execute on one or more processor core(s), e.g., processor core(s) 220a, . . . , 220n, in parallel. In this example, network interface 216 includes a plurality of ports 235a, . . . , 235n that each include a respective receiver NIC Rx 322a, . . . , 322n (e.g., Rx 237) and respective transmitter NIC Tx 324a, . . . , 324n, e.g., Tx 236. For example, a packet processing pipeline may include thread 0, thread 1, thread 2 through thread (n+1) and thread (n+2), configured to process packets for a plurality of traffic flows. The threads may be configured to execute in parallel on different packets in the pipeline. In this example, thread 0 includes Pkt I/O Rx 302 and Pkt parse 304, thread 1 includes Classif 306, Policer 308 and Load balancer 210, threads 2 through (n+1) each include a respective worker 312a, . . . , 312n and thread (n+2) includes Dropper 314, Hier Sched 316 and Pkt I/O Tx 318. Continuing with this example, the packet processing pipeline and associated threads may be configured to process packets for one physical port, e.g., port 235a and Rx 237 and Tx236 that may correspond to NIC RX 0 and NIC TX 0, respectively.

In some embodiments, one physical port may be shared by a plurality of threads. A plurality of subports may be associated with the physical port, as described herein. Each subport may then be associated with a respective thread. Enqueue and dequeue operations for a physical port may be associated with a same thread. Enqueue and dequeue operations associated with scheduler 316 are configured to be implemented by a same thread, e.g. thread (n+2). Enqueue and dequeue operations may share, e.g., packet descriptors, a queue table, queue storage area and a bitmap of active queues, as described herein. Implementing these operations by the same thread is configured to provide improved operational efficiency by allowing the queues and the bitmap operations to be non-thread safe and maintaining the scheduler data structures internal to the same processor core. Thus, using locking primitives for access serialization or atomic primitives for lockless access may be avoided.

FIG. 3C illustrates an example 330 of mapping some packet processing pipeline functional blocks to a plurality of processor cores. In this example, the packet processing pipeline functional blocks are mapped to two processor cores, e.g., 220a, . . . , 220n of FIG. 2. In this example, packet receive functional blocks including Pkt Rx 333 (e.g., Pkt I/O Rx and Pkt parse) and Classif 304 are mapped to a first processor core 332a (e.g., processor core 220a) and traffic management 334 (e.g., Dropper 314 and Hier Sched 316) and packet transmit functions (e.g., Pkt I/O Tx 318) are mapped to a second processor core 332b (e.g., processor core 220b). In this example, traffic management 334 includes a scheduler enqueue module, a plurality of queues and a scheduler dequeue module.

FIG. 3D illustrates another example 340 of mapping some packet processing pipeline functional blocks to a plurality of processor cores. In this example, the packet processing functional blocks are mapped to three processor cores. In this example, packet receive functional blocks including Pkt Rx 333 and Classif 304 are mapped to a first processor core 332a (e.g., processor core 220a), traffic management 334 functions are mapped to a second processor core 332b (e.g., processor core 220b) and packet transmit functions are mapped to a third processor core 332b (e.g., processor core 220n). In this example, traffic management 334 includes a scheduler enqueue module, a plurality of queues and a scheduler dequeue module. For example, cores 332a, 332b, 332c may be included in processor 210 and thus may correspond to processor cores 220a, . . . 220n.

Thus, a plurality of packets associated with a plurality of traffic flows may be processed by network device 200 using one or more packet processing pipelines, e.g., packet processing pipeline 300. The functional blocks of the packet processing pipeline 300 may be implemented as one or more thread(s) on one or more processor core(s) 220a, . . . , 220n of network device 200. Mapping packet processing pipeline functional blocks to processor core(s) 220a, . . . , 220n may be configurable and may be based, at least in part, on a performance level associated with each traffic flow and associated application and a set of features enabled for each functional block. For example, some functional blocks may consume more than one processor core 220a, . . . , 220n (e.g., with each processor core 220a, . . . , 220n configured to execute a different instance of a same functional block but on different input packets). In another example, a plurality of functional blocks may be mapped to one processor core, e.g., processor core 220a. Pipelining, processing utilizing a plurality of threads and processing utilizing a plurality of cores facilitates processing, e.g., 64K or more packet flows.

Figure 4:
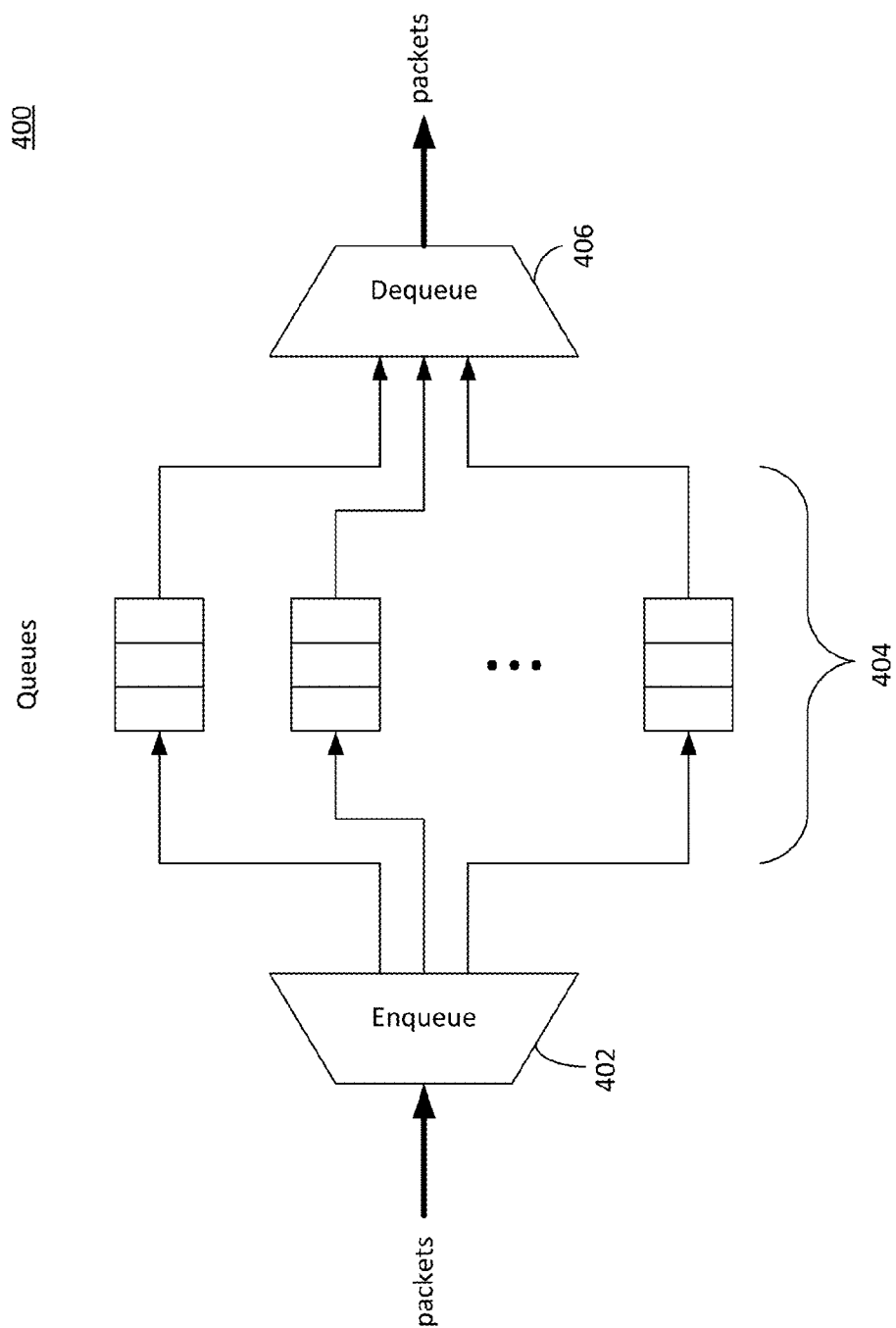
FIG. 4 illustrates an example scheduler module consistent with one embodiment of the present disclosure.

FIG. 4 illustrates an example scheduler module 400 consistent with one embodiment of the present disclosure. Scheduler 400 is one example of scheduler module 253 of FIG. 2. Scheduler 400 corresponds to, e.g., Hier Sched 316 of FIGS. 3A and 3B. Scheduler 400 includes an enqueue module 402, a plurality of queues 404 and a dequeue module 406. Enqueue module 402 is configured to enqueue, i.e., temporarily store, a plurality of packets prior to transmission. Enqueue module 402 is configured to select a queue of the plurality of queues 404 in which to store the packet prior to transmission, as described herein. Dequeue module 406 is configured to select stored packets for provision to a network interface, e.g., network interface 216, for transmission. Dequeue module 406 is configured to select a next packet for transmission based, at least in part, on a plurality of criteria, as described herein.

Scheduler 400 is configured to prioritize the transmission of packets from a plurality of users (e.g., clients) and a plurality of traffic classes according to a policy specified by a Service Level Agreement (SLA) associated with each network node, e.g., network nodes 105a, . . . , 105n. Scheduler 400 is configured to manage a relatively large (e.g., on the order of tens of thousands or more) number of traffic flows and related queues. Scheduler 400 is configured to logically group packets into a plurality of hierarchical levels and to select a next packet to be transmitted based, at least in part, on user, traffic class and criteria related to the hierarchical level. Scheduler 400 may be further configured utilize one or more of traffic shaping, strict priority and weighted round robin in its selection process, as described herein.

Figure 5:
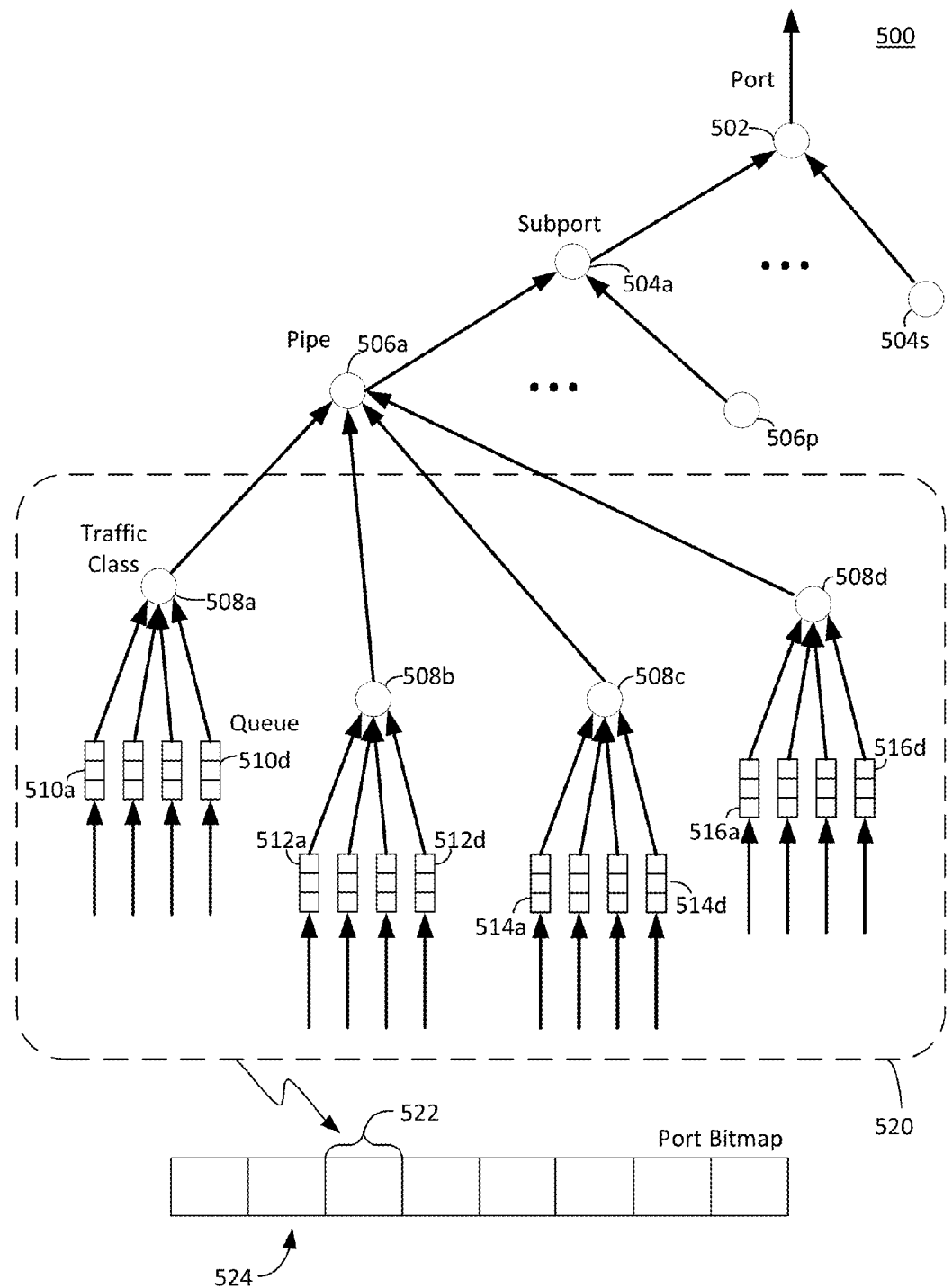
FIG. 5 illustrates an example scheduling hierarchy consistent with various embodiments of the present disclosure.

FIG. 5 illustrates an example scheduling hierarchy 500 consistent with various embodiments of the present disclosure. Scheduling hierarchy 500 represents logical groupings of traffic flows and is configured to facilitate selecting a next packet for transmission, as described herein. The logical groupings are further configured to facilitate satisfying SLAs for each traffic class for a plurality of users. The logical groupings may be implemented in a data structure that may then be exploited to facilitate processing efficiency when selecting the next packet for transmission.

In this example, scheduling hierarchy 500 includes five levels: port, subport, pipe, traffic class and queue. In some embodiments, a scheduling hierarchy may include more or fewer levels. The numbers of members of each level may depend on, e.g., capabilities of an associated network device, characteristics of service provider network, requirements of Service Level Agreements, number of network notes, etc. For example, a scheduler, e.g., scheduler 253, of a network device that includes a network interface with a plurality of ports may be configured to implement a plurality of scheduling hierarchies with one hierarchy per port, e.g., port 235a, . . . , 235n. A scheduler, e.g., scheduler 253, is configured to group queues (e.g., on the order of tens of thousands of queues) and associate one or more packet flows(s) with each queue (e.g., on the order of hundreds of thousands or more of packet flows) according to scheduling hierarchy 500 and to utilize the groups and related criteria in selecting (i.e., scheduling) packets for transmission, as described herein.

The first level of the scheduling hierarchy 500 is the port 502. Port 502 corresponds to a port, e.g., port 235a, . . . , 235n, of network interface 216. For example, port 502 may correspond to an Ethernet Tx port with a bit rate on the order of gigabits per second, e.g., 1 GbE (Gigabits per second Ethernet), 10 GbE and/or 40 GbE. Scheduler 253 may be configured to schedule a plurality of ports in round robin order with each port having equal priority.

Subport(s) 504a, . . . , 504s are the second level of the scheduling hierarchy 500 corresponds to one or more. The number of subports per port may be set, for example, by a network service provider. For example, the number of subports per port may be eight. In some embodiments, each subport may represent a predefined group of users. A plurality of pipes 506a, . . . , 506p are the third level of the scheduling hierarchy 500. The number of pipes per subport may be set, for example, by the network service provider. For example, the number of pipes per subport may be four thousand. The number of pipes per subport may generally be in the order of thousands. In some embodiments, a pipe may represent a user, e.g., a subscriber.

A plurality of traffic classes 508a, . . . , 508d are the fourth level of the scheduling hierarchy. The number of traffic classes is typically a power of two and is generally relatively small. In this example, the number of traffic classes is four. Thus, each pipe, e.g., pipe 506a, includes four traffic classes, e.g., traffic classes 508a, . . . , 508d. Each traffic class 508a, . . . , 508d corresponds to a respective traffic type, e.g., voice, interactive video, non-interactive video, data transfers (file transfers, application downloads, email traffic, web browsing, etc.). Each traffic class 508a, . . . , 508d may have associated transmission parameters related to, for example, an associated SLA and/or QoS (Quality of Service) specification. For example, transmission parameters may include, but are not limited to, associated permissible loss rate, permissible delay and/or permissible jitter specification.

The fifth level of the scheduling hierarchy 500 corresponds to a plurality of queues 510a, . . . , 510d, 512a, . . . , 512d, 514a, . . . , 514d, 516a, . . . , 516d. In this example, the number of queues per pipe is sixteen. Each traffic class, e.g., traffic class 508a, includes four queues, e.g., queues 510a, . . . , 510d. Each queue 510a, . . . , 510d, 512a, . . . , 512d, 514a, . . . , 514d, 516a, . . . , 516d is configured to store packets from one or more connections (i.e., traffic flows) of a same type belonging to a same user.

Scheduler 253 may be configured to implement traffic shaping at the subport and pipe level using a token bucket technique with one token bucket per subport and one token bucket per pipe, as described herein. A respective upper limit may be enforced per traffic class at the subport level and at the pipe level. Scheduler 253 may be further configured to allow lower priority traffic classes to reuse subport bandwidth and/or pipe bandwidth that may be unused by higher priority traffic classes, as described herein.

Scheduler 253 may be configured to schedule traffic classes of a same pipe in strict priority order. If a subport traffic class is oversubscribed (e.g., a configuration time event), the pipe level traffic class upper limit may be limited to a dynamically adjusted value that is shared by all the pipes associated with the subport. Scheduler 253 may be configured to schedule queues of the same traffic class using a Weighted Round Robin (WRR) technique according to predefined weights.

Figure 6:
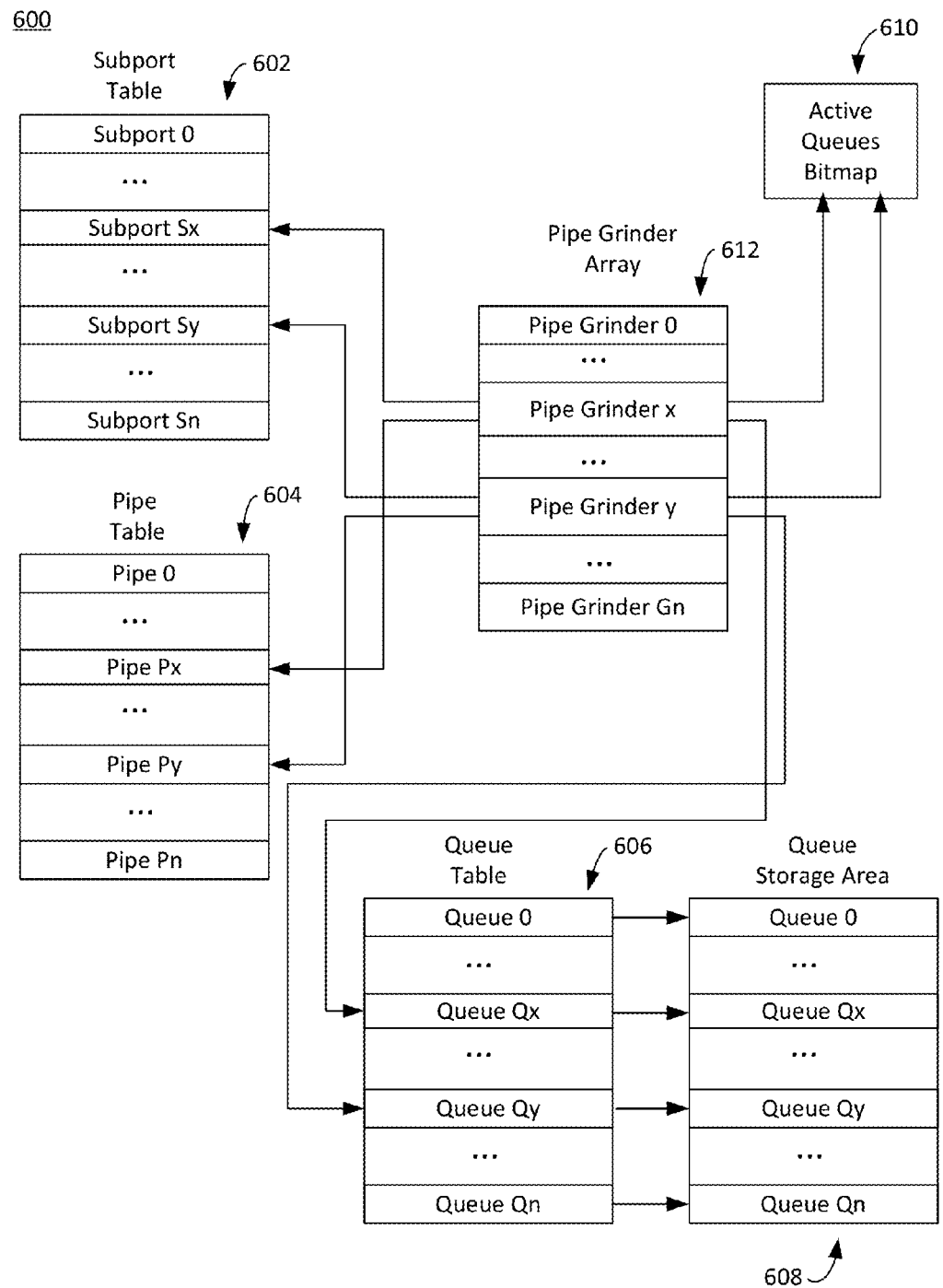
FIG. 6 illustrates an example hierarchical scheduler data structure consistent with various embodiments of the present disclosure.

FIG. 6 illustrates an example scheduler data structure 600 consistent with various embodiments of the present disclosure. Scheduler data structure 600 corresponds to scheduling hierarchy 500. Scheduler 253 may be configured to implement a respective scheduler data structure, e.g., scheduler data structure 600, for each port, e.g., port 235a, . . . , 235n. Scheduler data structure 600 includes a subport table 602, a pipe table 604, a queue table 606, a queue storage area 608, an active queues bitmap 610 and a pipe grinder array 612.

Subport table 602 includes a plurality of subport table entries Subport 0, . . . Subport Sn. For example, each subport entry Subport 0, . . . Subport Sn may have a size of 64 bytes. The number of subport table entries corresponds to the number of subports per port. Each subport table entry Subport 0, . . . Subport Sn is configured to store persistent subport data, e.g., token bucket credits, associated with each subport, e.g., subports 504a, . . . , 504s. Subport table 602 may be accessed for reading and/or writing associated with dequeue operations by, e.g., scheduler 253.

Pipe table 604 includes a plurality of pipe table entries Pipe 0, . . . Pipe Pn. For example, each pipe entry Pipe 0, . . . Pipe Pn may have a size of 64 bytes. The number of pipe table entries corresponds to the number of pipes per port. Each pipe table entry Pipe 0, . . . Pipe Pn is configured to store persistent data associated with each pipe, e.g., pipe 506a, including persistent data related to the traffic classes, e.g., traffic classes 508a, . . . , 508d, and the queues associated with the pipe, e.g., queues 510a, . . . , 510d, 512a, . . . , 512d, 514a, . . . , 514d, 516a, . . . , 516d. For example, the persistent data may include token bucket credits. Pipe table entries Pipe 0, . . . Pipe Pn may be updated during, e.g., run-time, as described herein. Generally, pipe configuration parameters that do not change during run-time and may be shared by multiple pipes are not be included in pipe table 604. Such pipe configuration parameters may be included in a pipe profile table, as described herein. Pipe table 604 may be accessed for reading and/or writing associated with dequeue operations by, e.g., scheduler 253.

Queue table 606 includes a plurality of queue entries. For example, each queue entry Queue 0, . . . , Queue Qn may have a size of 4 bytes. A number of queue table entries corresponds to the number of queues per port. Each queue table entry Queue 0, . . . , Queue Qn is configured to store persistent data, e.g., read and write pointers. A queue size of each queue may be the same for each traffic class for all queues. A consistent queue size is configured to allow a queue base address to be determined efficiently, thus a queue base address and queue size may not generally be included in a respective queue table entry. Queue table 606 may be accessed for reading and/or writing associated with enqueue and dequeue operations by, e.g., scheduler 253. The queue table entries associated with a respective pipe may typically be stored in a same cache line of, e.g., processor cache 222a.

Queue storage area 608 includes a plurality of queues Queue 0, . . . , Queue Qn. The number of queues Queue 0, . . . , Queue Qn corresponds to the number of queues per port. Each queue Queue 0, . . . , Queue Qn may be configured to store a number of queue elements. The number of queue elements may be configurable. For example, each queue Queue 0, . . . , Queue Qn may be configured to store 64 8-byte elements. Each 8-byte queue element corresponds to a memory address (i.e., mbuf pointer) of a packet descriptor. The packet descriptor (i.e., mbuf) is a relatively small data structure (typically 64 bytes or less) for each packet that contains metadata associated with the packet (e.g., packet length, position of first byte of data in the buffer, etc.). Typically, mbuf is located in the same memory buffer with the packet body (i.e., headers and payload) at specific memory locations in the memory buffer. Queue storage area 608 may be accessed for reading associated with dequeue operations and/or writing associated with enqueue operations by, e.g., scheduler 253. For example, packet enqueue corresponds to the mbuf pointer being written to the queue and packet dequeue corresponds to the mbuf pointer being read from the queue.

Active queues bitmap 610 is configured to include one queue status bit per queue Queue 0, . . . , Queue Qn. The number of queue status bits per port corresponds to the number of queues per port. For example, port bitmap 524 of FIG. 5 includes a bitmap portion 522 that corresponds to the queues 520 associated with pipe 506a. The queue status bit is configured to indicate whether a queue Queue 0, . . . , Queue Qn is active (i.e., queue is not empty) or the queue Queue 0, . . . , Queue Qn is not active (i.e., queue is empty). Each queue status bit may be set by, e.g., scheduler 253 enqueue operations (i.e., packet(s) enqueued) and reset (i.e., cleared) by the scheduler 253 dequeue operations when the respective queue becomes empty. In operation, a bitmap scan operation is configured to return a next non-empty pipe and its status (e.g., a 16-bit mask of active queue(s) in the pipe).

Pipe grinder array 612 includes a plurality of pipe grinders Pipe Grinder 0, . . . , Pipe Grinder Gn. For example, the pipe grinder array 612 may have a size of approximately 128 bytes. A number of pipe grinders Pipe Grinder 0, . . . , Pipe Grinder Gn may be configurable. For example, the number of pipe grinders may be eight. Pipe grinder array 612 is configured to store a list of active pipes that are currently being processed. Each pipe grinder Pipe Grinder 0, . . . , Pipe Grinder Gn contains temporary data during pipe processing. If a current pipe exhausts packets or credits, it is replaced with another active pipe from the bitmap 610. Pipe grinder array 612 may be accessed for reading and/or writing associated with dequeue operations by, e.g., scheduler 253.

Scheduler module 253 is configured utilize to a scheduling hierarchy, e.g., scheduling hierarchy 500, and data structures 248, e.g., data structures 600, in its packet processing operations (i.e., enqueue and dequeue operations). The scheduler module 253 is further configured to exploit the plurality of processor cores 220a, . . . , 220n and multi-threading capabilities of network device 200 to improve processing efficiency. Thus, scheduler 253 may efficiently select a next packet for transmission from thousands of queues while satisfying SLA commitments.

Figure 7:
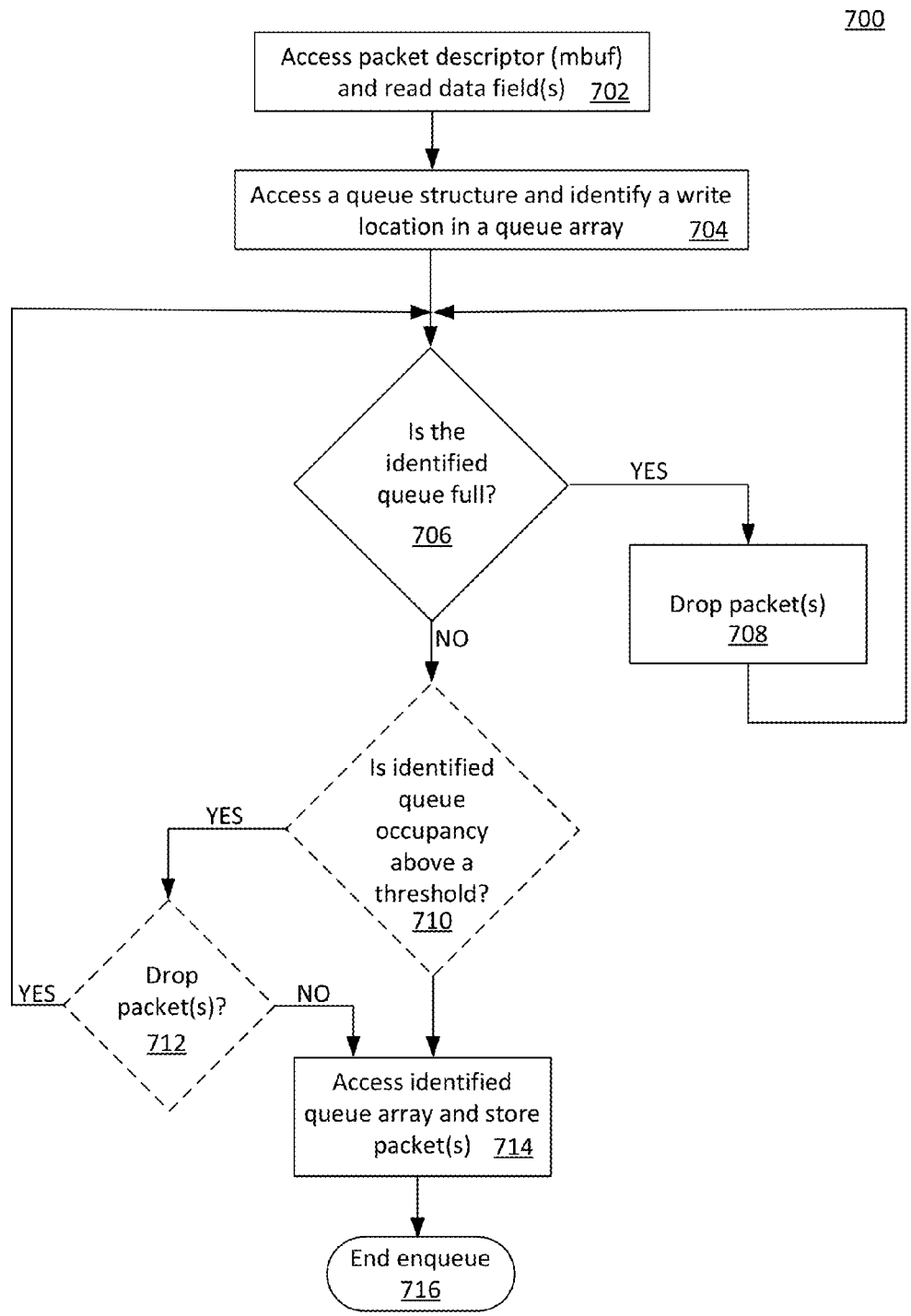
FIG. 7 illustrates a flowchart of example operations configured to enqueue a plurality of packets consistent with an embodiment of the present disclosure.

FIG. 7 illustrates a flowchart 700 of example operations configured to enqueue a plurality of packets consistent with an embodiment of the present disclosure. The operations may be performed, for example, by scheduler module 253. In some embodiments, e.g., when congestion management is implemented, congestion management operations may be performed, for example, by congestion management module 257. Initially, one or more packets may be received from, e.g., a worker module or a congestion management module. Operation 702 may include accessing a packet descriptor (mbuf) and reading data fields. Data fields may include, e.g., packet type, packet length, a pointer to the start of the data, etc. The data fields may be read in order to identify a destination queue for each packet. For example, the data fields may include port, subport, traffic class and queue within traffic class identifiers. The data fields may be determined by a classification stage, e.g., Classif 306, prior to the packets being received by scheduler module 253. Operation 704 may include accessing a queue structure, e.g., queue table 606, and identifying a write location in a queue array, e.g., queue storage area 608.

Whether the identified queue is full may be determined at operation 706. If the identified queue is full, operation 708 may include dropping packet(s). Program flow may then return to determining whether the identified queue is full. Subsequent packets may also be dropped until packet(s) are dequeued from the identified queue. If the identified queue is not full and congestion management is enabled, whether the identified queue occupancy is above a threshold may be determined at operation 710. If the identified queue occupancy is above the threshold, whether to drop the packet may be determined based, at least in part, on congestion management at operation 712. Congestion management may include random early detection (RED) or weighted random early detection (WRED). RED and/or WRED are configured to consider queue occupancy and packet priority in order to determine whether to enqueue or drop a specific packet. For example, a higher priority packet may be more likely to be enqueued than a lower priority packet, e.g., when target queue occupancy is relatively high. RED and WRED are configured to provide a relatively more intelligent decision regarding enqueuing or dropping packets compared to indiscriminately dropping packet(s). If the packet(s) are not dropped, the identified queue array location may be accessed and the packet(s) stored at operation 714. For example, storing the packet(s) may correspond to writing the mbuf pointer. Program flow may end at operation 716.

The data structures accessed to enqueue the current packet(s) may not be present in the cache of the current core (e.g., cache 222a of core 220a) because of the relatively high rate (e.g., gigabits per second) of input packets and the relatively large number of queues (e.g., tens of thousands). Thus, the enqueue-related memory accesses may result in one or more cache misses and a corresponding degradation in performance. It may therefore be beneficial to prefetch the data structures in advance.

Figure 8:
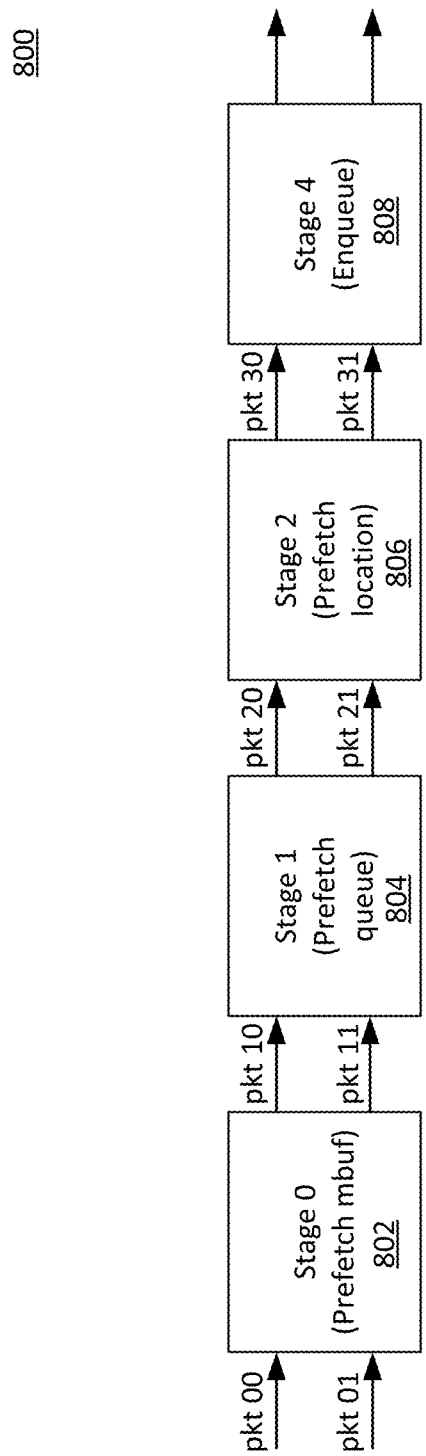
FIG. 8 illustrates an example pipelined implementation for enqueue operations.

FIG. 8 illustrates an example pipelined implementation 800 for the enqueue operations that includes prefetching. The example implementation 800 includes four pipeline stages: prefetch mbuf 802, prefetch queue 804, prefetch location in the queue 706 and enqueue 808. Each stage 802, 804, 806, 808 is configured to execute on two different input packets in parallel. For example, prefetch mbuf 802 may be operating on packets 00 and 01, prefetch queue 804 may be operating on packets 10 and 11, etc. Each input packet may be part of (i.e., operated on by) one pipeline stage at a given time and a plurality of packets may be operated on in parallel. The prefetch operation has an associated execution latency during which the processor 210 may not attempt to access the data structure currently under prefetch. Processor 210 may be configured to execute other work, e.g., execute different stages of the enqueue sequence of operations on other input packets, thus resulting in a pipelined implementation for the enqueue operation.

Thus, a plurality of packets may be operated on in parallel during enqueue operations. Each input packet may not be operated on by more than one pipeline stage at a time but a plurality of packets may be operated on by a plurality of pipeline stages at any point in time. The pipeline structure is configured to "hide" prefetch latencies and thereby enhance performance for packet enqueue operations.

Figure 9A:
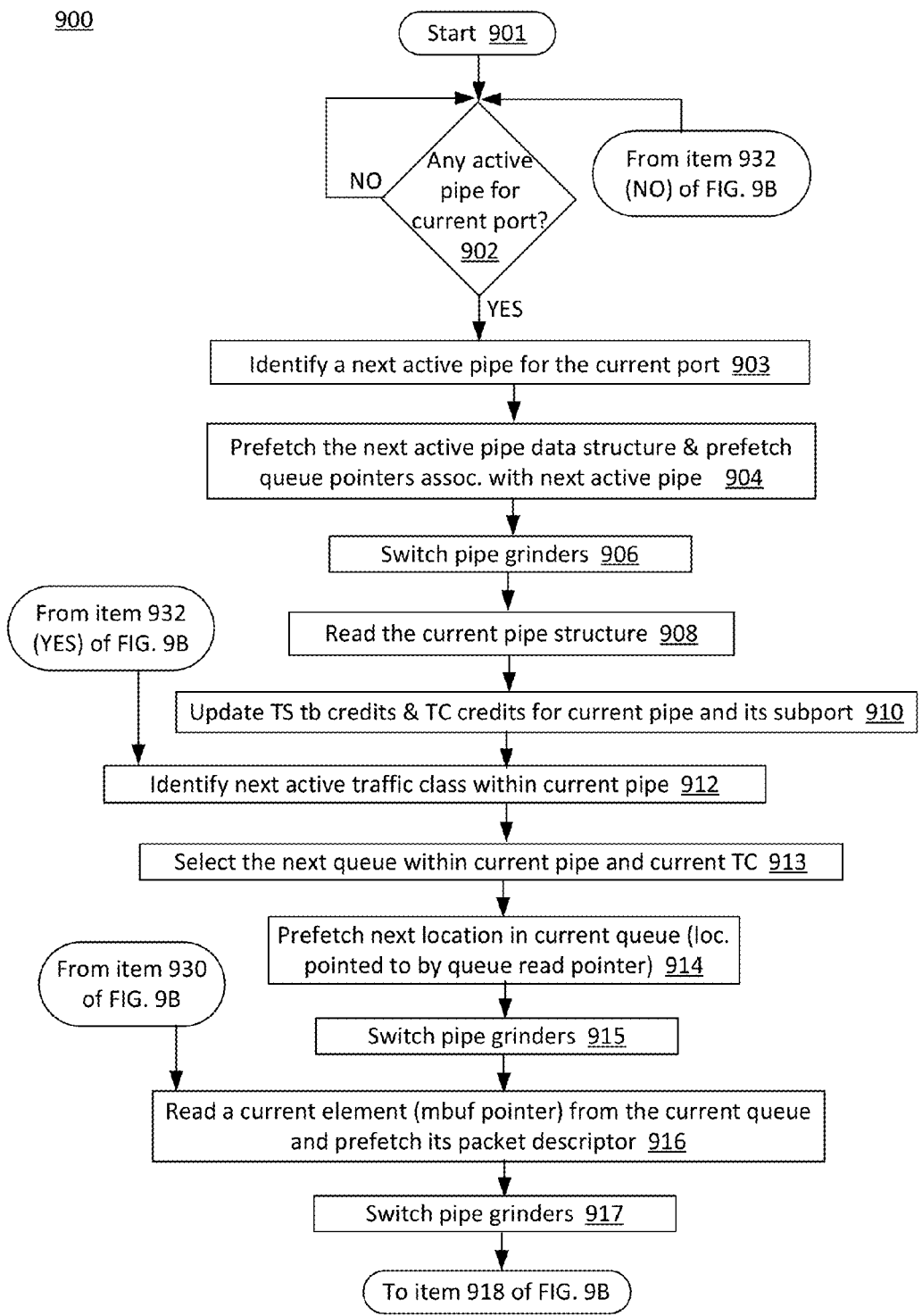
FIGS. 9A and 9B illustrate flowcharts of example operations configured to dequeue a plurality of packets consistent with an embodiment of the present disclosure.
Figure 9B:
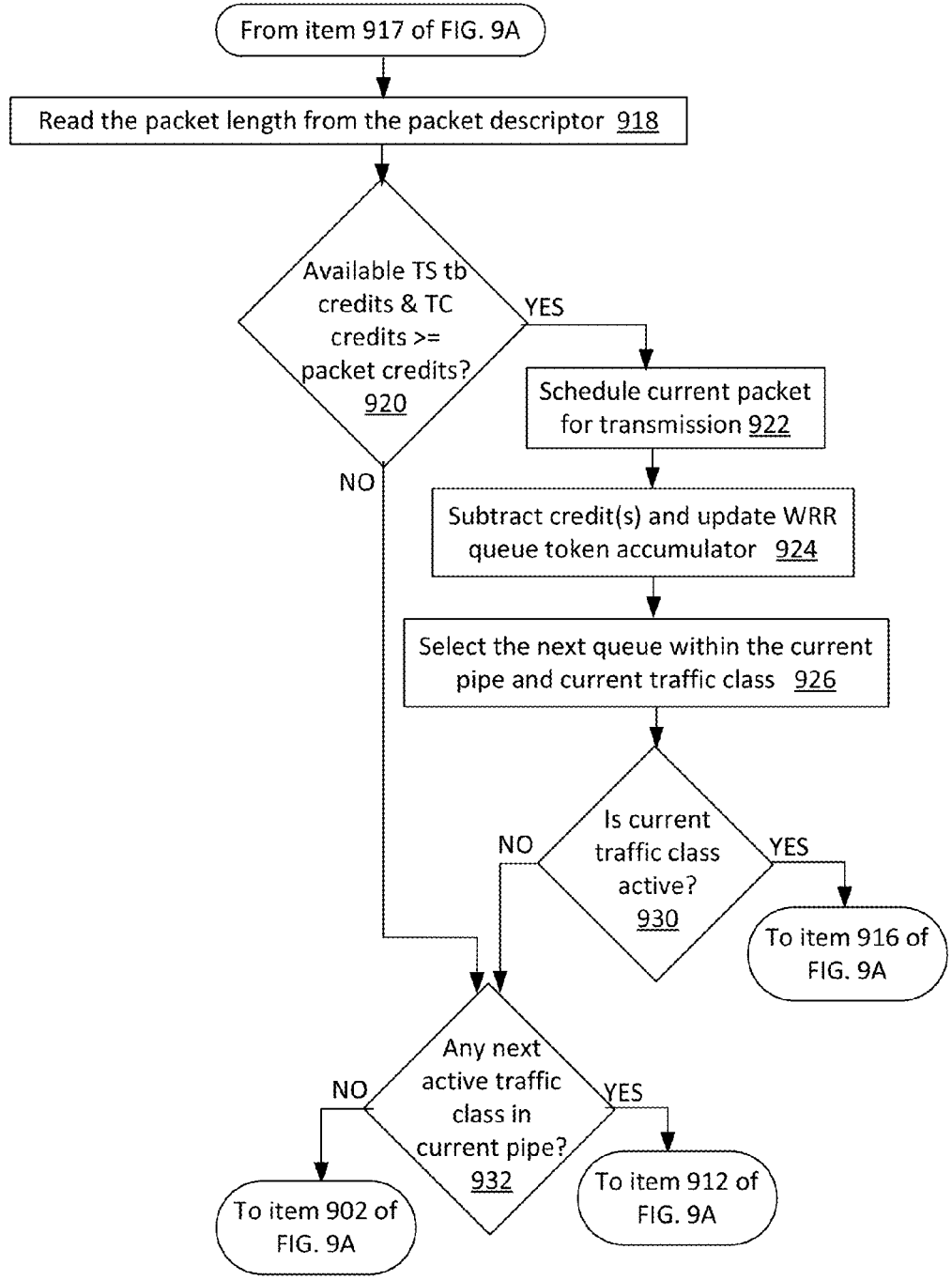

FIGS. 9A and 9B illustrate flowcharts 900, 950 of example operations configured to dequeue a plurality of packets consistent with an embodiment of the present disclosure. The operations may be performed, for example, by scheduler module 253 and may be performed for each port, e.g., port 235a. Flowchart 950 is continuation of flowchart 900, as described herein. Program flow may begin with start 901. Whether any pipe in a current port is active may be determined at operation 902. For example, whether active queues bitmap 610 includes any bits that are set and that correspond to pipe(s) not already included in pipe grinder array 612 may be determined by hierarchical scheduler 253. If there are no active pipes for the current port, program flow may remain at operation 902. If there are active pipe(s), operation 903 may include identifying a next active pipe for the current port. For example, the next active pipe may be identified using a bitmap scan operation, e.g., of the active queues bitmap 610. The bitmap scan operation is configured to return a next non-empty pipe identifier and associated status (i.e., a 16-bit mask of active queues in the pipe).

Operation 904 includes prefetching the next active pipe data structure and prefetching queue pointers associated with the next active pipe. Operation 906 may include switching pipe grinders. For example, operation 906 may include switching from a first pipe grinder to a second pipe grinder, as described herein. Switching pipe grinders is configured to "hide" the prefetching operations associated with the next active pipe. In other words, switching pipe grinders is configured to allow the prefetching operations associated with the next active pipe to occur in parallel with packet dequeue operations associated with a current pipe. As used herein, current pipe corresponds to the pipe currently selected for dequeue operations and the next active pipe corresponds to the next pipe to be selected for dequeue operations. Thus, the next active pipe identified at operation 903 in a current pass through flowcharts 900, 950 may correspond to the current pipe in a next pass through the operations of flowcharts 900, 950.

Operation 908 may include reading the current pipe data structure. Operation 910 may include updating the credits for the current pipe and its subport. For example, respective traffic shaping token bucket credits for the current pipe and its subport and respective traffic class credits associated with the current pipe and its subport may be updated. A next active traffic class within the current pipe may be identified at operation 912. Operation 913 may include selecting the next queue within the current pipe and current traffic class (TC). For example, the next queue may be selected using weighted round robin (WRR). Operation 914 includes prefetching a next location in the current queue (i.e., the location pointed to by the queue read pointer). Prefetching the next location in the current queue corresponds to prefetching the data structure (at the location pointed to by the queue read pointer) that contains the queue elements (i.e., queue array). The queue pointer was prefetched at operation 904. Each queue element is an mbuf pointer. Queue read pointer corresponds to a queue pointer that was prefetched in operation 904. Operation 915 may include switching pipe grinders.

Operation 916 may include reading a current element (i.e., mbuf pointer) from the current queue and prefetching its packet descriptor (i.e., mbuf). Operation 917 includes switching pipe grinders. Operation 918 may include reading the packet length from the packet descriptor. Whether available traffic shaping (TS) token bucket credits and available traffic class credits are greater than or equal to packet credits may be determined at operation 920. Packet credits corresponds to packet length (in bytes) plus framing overhead (in bytes). Respective traffic shaping token bucket credits may be provided per subport and per pipe and may be utilized for traffic shaping, as described herein. Respective traffic class credits may be provided per subport and per pipe and may be utilized to implement an upper limit at the subport level and at the pipe level for each traffic class, as described herein. If the available token bucket credits and the available TC credits are not greater than or equal to the packet credits, program flow may proceed to operation 932.

If the available traffic shaping token bucket credits and the available TC credits are greater than or equal to the packet credits, the current packet may be scheduled for transmission at operation 922. Credit(s) may be subtracted and a weighted round robin (WRR) queue token accumulator may be updated at operation 924. For example, credits may be subtracted from token buckets for the selected pipe and associated subport and credit(s) may be subtracted from credit counters at the pipe and subport levels for the selected traffic class. The number of credits subtracted corresponds to the number of bytes sent (i.e., packet credits). The queue token accumulator may be incremented by an amount (e.g., in bytes) corresponding to the packet length. A next queue within the current pipe and current traffic class may be selected at operation 926.

Whether the current traffic class is active may be determined at operation 930. If the current traffic class is active, program flow may return to operation 916, reading a current element from the current queue and prefetching its packet descriptor. If the current traffic class is not active, whether any next traffic class in the current pipe is active may be determined at operation 932. If a next traffic class in the current pipe is active, then program flow may return to operation 912, identifying a next traffic class within the current pipe. If there is no next traffic class in the current pipe that is active, program flow may return to operation 902, determining whether any pipe is active for the current port.

Operation 932, determining whether a next traffic class is active, is configured to avoid returning to a traffic class in the current pipe that has already been served. For example, the traffic class may have been inactive when the next active traffic class was identified, e.g., at operation 912. In another example, the traffic class may be active but may have lacked sufficient traffic shaping token bucket credits and/or traffic class credits.

To avoid the cache misses, operations of flowchart 900, e.g., operation 904, are configured to prefetch data structures (e.g., pipe, queue, queue array, mbufs) in advance of being accessed. The latency of the prefetch operations may be "hidden" by switching from a current pipe, e.g., in pipe grinder 1, to another pipe (i.e., the next active pipe), e.g., in pipe grinder 2, immediately after a prefetch is issued for the current pipe. The prefetch operation of the current pipe may thus complete before the execution switches back to this pipe in pipe grinder 1.

The operations of flowcharts 900, 950 are configured to exploit the data presence into a processor cache. For example, scheduler module 253 may be configured to schedule as many packets from the same pipe traffic class and pipe as possible (up to the available packets and credits) before moving to the next active traffic class from the same pipe (if any) or to another active pipe.

Figure 10:
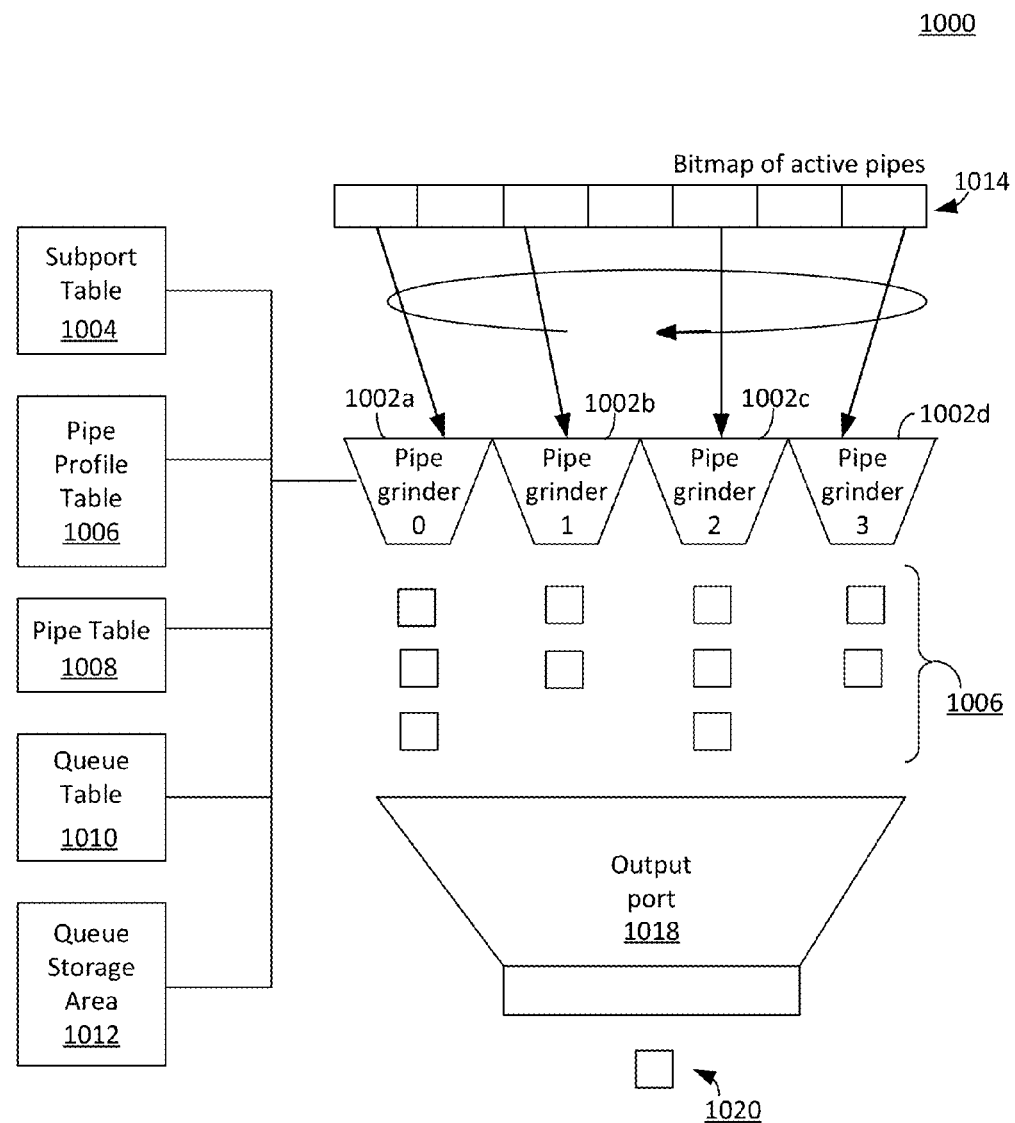
FIG. 10 illustrates an example dequeue operation consistent with one embodiment of the present disclosure.

FIG. 10 illustrates an example dequeue operation 1000 consistent with one embodiment of the present disclosure. The example dequeue operation 1000 is configured to utilize a hierarchical scheduler data structure, e.g., data structure 600. The pipe grinders 1002a, . . . , 1002d may be coupled to a subport table 1004, a pipe profile table 1006, a pipe table 1008, a queue table and/or a queue storage area 1012.

The pipe profile table is configured to store pipe configuration values that do not change for packets of the same pipe. Such pipe configuration values are typically related to the SLA and may include, e.g., period, credits per period, etc. Thus, pipe profile table values may change if the SLA is modified but do not typically change for packets of the same pipe. For example, a telecommunications network may be configured with a relatively small number (e.g., fewer than ten) of service classes. A respective pipe profile may be created for each service class and a number (e.g., on the order of thousands) of pipes may be sharing same service class and therefore the same pipe profile values. The pipe table entry, which contains the data that changes on a per packet basis (e.g. pipe token bucket counter, remaining credits per traffic class, WRR counters, etc.), may thus be reduced in size since relatively static data for a plurality of pipes is stored in the pipe profile table.

Minimizing the pipe table entry is configured to reduce the amount of data to be prefetched per pipe. Prefetching is configured to prefetch pipe data in increments of cache line size (e.g., 64 bytes) that is related to processor physical architecture. Thus, for each pipe, the hierarchical scheduler is configured to prefetch the pipe table entry structure and the queue pointers for all the 16 queues of the same pipe. The queue pointers may then be stored in a second cache line. The hierarchical scheduler may be configured to launch both prefetches as the same time, e.g., operation 904 of FIG. 9.

In this example, the pipe grinder array includes four pipe grinders 1002a, . . . , 1002d corresponding to four active pipes. The active pipes are indicated by bitmap 1014. A hierarchical scheduler, e.g., scheduler 253, is configured select each of the pipe grinders 1002a, . . . , 1002d to manage scheduling packets 1016 for transmission by output port 1018, e.g., output packet 1020. The plurality of active pipes associated with pipe grinders 1002a, . . . , 1002d may be utilized to facilitate pipelining. The plurality of pipe grinders 1002a, . . . , 1002d are configured to process a plurality of pipes in parallel.

For example, to avoid the cache misses, the data structures (e.g., pipe, queue, queue array, mbufs) may be prefetched in advance of being accessed. A latency of the prefetch operations may be "hidden" by switching from the current pipe (e.g., in grinder 1002b) to another pipe (e.g., in grinder 1002c) immediately after a prefetch is issued for the current pipe. This is configured to provide enough time for the prefetch operation to complete before the execution switches back to this pipe (e.g., in grinder 1002b).

Figure 11:
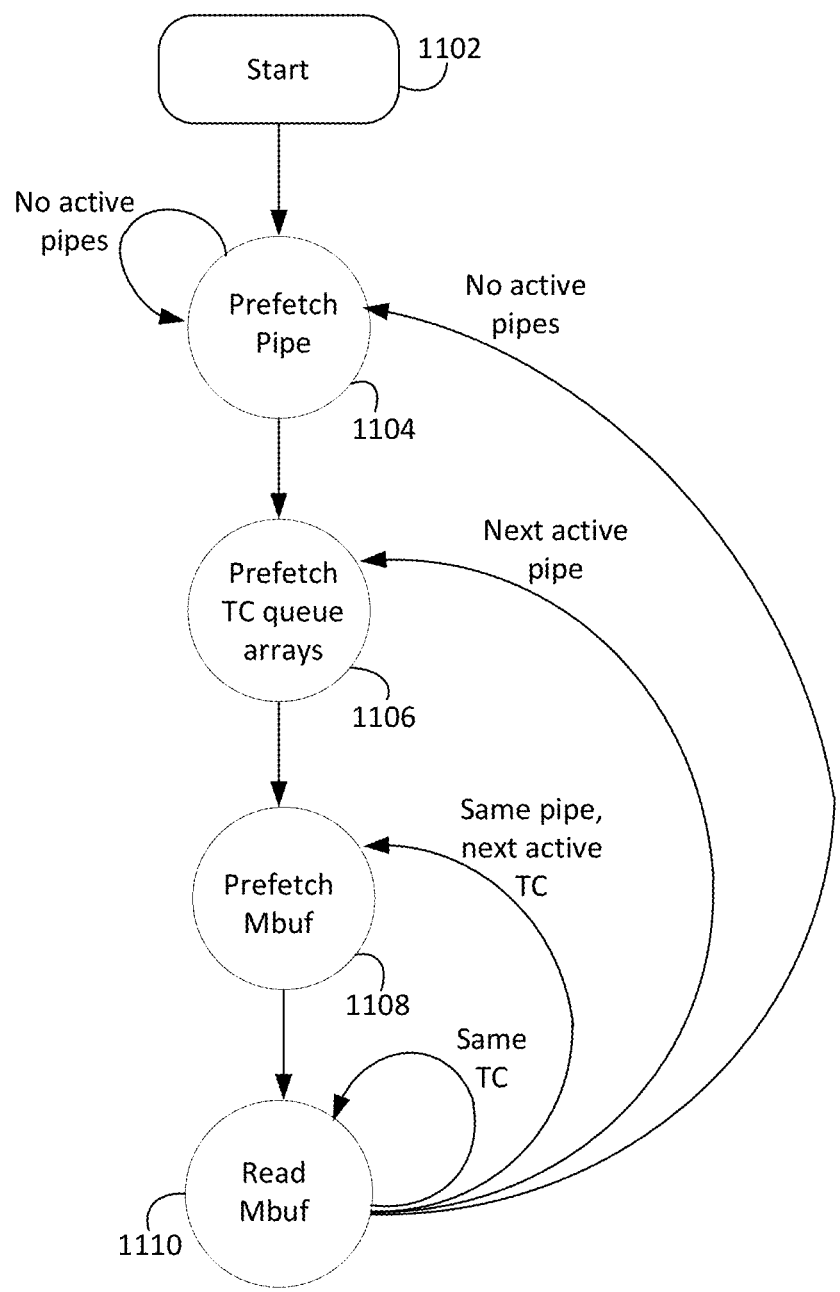
FIG. 11 is an example of a pipe prefetch state machine consistent with the present disclosure.

FIG. 11 is an example 1100 of a pipe prefetch state machine consistent with the present disclosure. The example 1100 pipe prefetch state machine is configured to exploit data locality by, e.g., sequentially scheduling packets from a same traffic class as long as token bucket credits are available and the pipe level and subport level traffic class upper limits are not exceeded. States associated with the state machine 1100 include start 1102, prefetch pipe 1104, prefetch traffic class queue arrays 1106, prefetch mbuf 1108 and read mbuf 1110. State machine 1100 is generally configured to proceed sequentially from start 1102 to prefetch pipe 1104 to prefetch traffic class queue array 1106 to prefetch mbuf 1108 to read mbuf 1110. If the current state is prefetch pipe 1104 and there are no active pipes, i.e., no pipes with at least one active queue, the state machine 1100 is configured to remain in the prefetch pipe 1104 state.

If the current state is read mbuf 1110, the state machine 1100 is configured to remain in the read mbuf 1110 state, as long as a same traffic class associated with the pipe has active queues (and available credits). For example, if packet credit(s) associated with mbuf (and an associated first packet) are less than or equal to available token bucket and TC credits, the first packet may be scheduled for transmission, as described herein. Continuing with this example, if additional packet(s) in the same traffic class and same pipe as the first packet are awaiting scheduling, the state transition is "same TC" and a next state corresponds to read mbuf.

State machine 1100 is configured to transition from the read mbuf state 1110 to the prefetch mbuf state 1108 if a next active traffic class is in the same pipe as the current active traffic class. For example, transition from read mbuf 1110 to prefetch mbuf 1108 may occur if the packet credits of the first packet exceeded the available credits or no additional packet(s) in the same traffic class were awaiting scheduling and a traffic class in the same pipe has active queue(s).

State machine 1100 is configured to transition ("next active pipe") from the read mbuf state 1110 to the prefetch traffic class queue arrays state 1106 if the next active queues are in a next active pipe. For example, transition from read mbuf 1110 to prefetch TC queue arrays 1106 may occur if the packet credits of the first packet exceeded the available credits or no additional packet(s) in the same traffic class were awaiting scheduling and no traffic class in the same pipe had active queue(s). State machine 1100 is configured to transition ("no active pipes") from the read mbuf state 1110 to the pipe prefetch state 1104 if there are no active pipes.

Thus, the example pipe prefetch state machine 1100 is configured to exploit data locality by scheduling packets from a same traffic class in a same pipe (as long as credits are available and upper limits are not exceeded) before moving to another traffic class in the same pipe. The example pipe prefetch state machine 1100 may be further configured to schedule packets from a same pipe as long as credits are available and upper limits are not exceeded. Example pipe prefetch state machine 1100 provides a serialized view of packet scheduling for a pipe. A plurality of active pipes may be processed in parallel. Each prefetch operation is configured to trigger a switch to another active pipe so that packet scheduling operations may continue while the prefetch operations are occurring. Thus, packet processing (i.e., scheduling) operations may be interlaced in time for the plurality of active pipes.

Thus, packet dequeue operations may be implemented by, e.g., scheduler 253, utilizing a scheduling hierarchy and a scheduler data structure, as described herein. A next active pipe may be identified using a bitmap scan operation (of e.g., active queues bitmap 610) configured to identify active queues and their associated pipe(s). A plurality of active pipes may be included in the pipe grinder array configured to facilitate parallel processing of pipes so that fetch latencies may be masked, thus enhancing operational efficiency.

Figure 12:
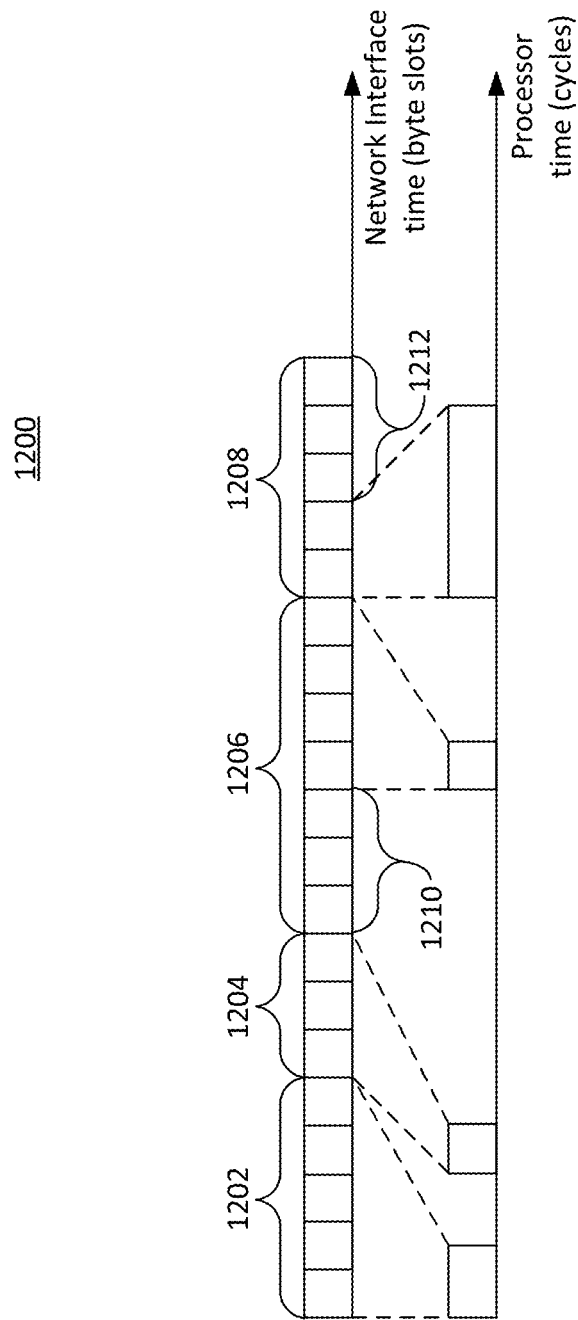
FIG. 12 illustrates an example of relative timing and synchronization for a scheduler and a network interface port.

FIG. 12 illustrates an example 1200 of relative timing and synchronization for a hierarchical scheduler and a network interface port. Each output port, e.g., port 235a, . . . , 235n, may be modeled as a conveyor belt of byte slots that are to be filled by the hierarchical scheduler with data for transmission. For example, a port capable of 10 GbE corresponds to 1.25 billion byte slots available to the hierarchical scheduler each second. If the hierarchical scheduler is unable to dequeue packets at a high enough rate to fill the slots, assuming that enough packets and credits exist, then some slots will be left unused and bandwidth will be wasted. In order to fully utilize the port, it is desirable that the hierarchical scheduler keep the byte slots full. While example 1200 illustrate timing and synchronization for one port, in operation, the hierarchical scheduler may be scheduling packets for a plurality of ports, in parallel. Example 1200 includes two time intervals 1202, 1204 where port bandwidth is fully utilized and two time intervals 1206, 1208 where the hierarchical scheduler was unable to keep the byte slots full.

In the first time interval 1202, the hierarchical scheduler is fast enough to fill the byte slots and no slots are wasted. In the second time interval 1204, the hierarchical scheduler processing precedes the transmission and the hierarchical scheduler is again fast enough to fill the byte slots. In the third time interval 1206, hierarchical scheduler latency results in a number of empty byte slots 1210 and, thus, unused (i.e., wasted) bandwidth. In the fourth time interval 1208, the hierarchical scheduler processing is slower than the port transmitter and some byte slots 1212 are empty, thus, available bandwidth is not fully utilized.

Generally, the hierarchical scheduler 253 dequeue operation may be triggered by a network interface transmitter (Tx), e.g., Tx 236. For example, the occupancy of a network interface Tx input queue may be monitored. If the occupancy of the network interface Tx input queue drops below a predefined threshold, the scheduler is notified (e.g., interrupt based or polling based) to push more packets into the queue.

The scheduler 253 is configured to monitor time advancement that may be utilized by credit logic. Credit logic may include subport and pipe traffic shaping, traffic class upper limit enforcement, etc. Credit logic is configured to update credits based, at least in part, on time, e.g., a duration of a time interval since a last update. When the scheduler decides to send a packet out to the network interface transmitter for transmission, the scheduler is configured to increment its internal time reference accordingly. Thus, it may be convenient to keep the internal time reference in units of bytes, where a byte signifies the time duration required by the physical interface, e.g., PHY 233, to send out a byte on the transmission medium. When a packet is scheduled for transmission, the time is incremented with (n+h), where n is the packet length in bytes and h is the number of framing overhead bytes per packet.

The scheduler 253 may be configured to align its internal time reference to a rate of packets being transmitted, i.e., the pace of the port conveyor belt. Aligning the scheduler time reference with the network interface time is configured to ensure that the scheduler does not provide the network interface, e.g., network interface Tx 236, with more bytes than the line rate of the physical medium. Thus, packet drop (e.g., by the scheduler, because the network interface Tx 236 input queue is full and/or internally by the network interface Tx) may be avoided.

The scheduler 253 is configured to read a current time in response to each dequeue invocation. The current processor time may be obtained by reading either a Time Stamp Counter (TSC) register or High Precision Event Timer (HPET) register 223 included in, e.g., core 220a and/or processor 210. The current processor time (i.e., CPU time stamp) may be converted from number of processor clock cycles to number of bytes as time_bytes=time_cycles/cycles_per_byte, where cycles_per_byte corresponds to an amount of processor cycles that is equivalent to the transmission time for one byte on the transmission medium (e.g., for a processor frequency of 2 GHz and a 10 GbE port, cycles_per_byte=1.6).

The scheduler 253 is configured to maintain an internal time reference related to the network interface time ("NIC Time"). When a packet is scheduled, the NIC time is incremented with the packet credits (i.e., packet length plus framing overhead). On each dequeue invocation, the scheduler 253 is configured to compare its internal reference 262 of the NIC time to the current processor time, i.e., processor time 263. If NIC time 262 is in the future (NIC time>=current processor time), NIC time may not be adjusted. Thus, scheduler 253 may schedule packets before the network interface actually needs those packets. In other words, the network interface Tx 236 is well supplied with packets. On the other hand, if NIC time is in the past (NIC time<current processor time), then NIC time 262 should be adjusted by setting it to the current processor time 263. Thus, the scheduler 253 may not be able to keep up with the speed of the NIC byte conveyor belt. In other words, bandwidth is unused (i.e., wasted) due to poor packet supply to the network interface Tx 236.

A scheduler round trip delay (SRTD) corresponds to the time (i.e., number of processor cycles) between two consecutive examinations of the same pipe by the scheduler. In order to keep up with the output port 235a (i.e., to avoid underutilization of available bandwidth), the scheduler 253 is configured to schedule n packets faster than n packets may be transmitted by network interface Tx 236. The scheduler is configured to schedule packets at a rate that corresponds to a packet transmission rate of each pipe, assuming no port oversubscription, as configured for an associated pipe token bucket, as described herein. Thus, the size of the pipe token bucket may be set high enough to avoid over flow due to a relatively long duration SRTD, as this would result in credit loss (and therefore bandwidth loss) for the pipe.

Scheduler 253 is configured to enqueue a plurality of packets corresponding to a first number of packet flows in a second number of queues and to dequeue the stored packets for transmission via one or more port(s) 235a, . . . , 235n. The first number is greater than or equal to the second number. The scheduler 253 is configured to utilize a scheduling hierarchy, e.g., scheduling hierarchy 500, data structures, e.g., data structures 600, and credit logic in order to make a scheduling decision, i.e., in order to select a next packet to dequeue.

The scheduling decision to send next packet from (subport S, pipe P, traffic class TC, queue Q) may be favorable (i.e., packet is sent) when the following criteria are satisfied:

1. Pipe P of subport S is currently selected by one of the port grinders;
2. Traffic class TC is the highest priority active traffic class of pipe P;
3. Queue Q is the next queue selected by WRR (weighted round robin) within traffic class TC of pipe P;
4. Subport S has enough credits to send the packet;
5. Subport S has enough credits for traffic class TC to send the packet;
6. Pipe P has enough credits to send the packet; and
7. Pipe P has enough credits for traffic class TC to send the packet.

If the above criteria are satisfied, then the scheduler 253 is configured to select the packet transmission and appropriate credits (i.e., tokens) may be subtracted from, e.g., token buckets associated with subport S, subport S traffic class TC, pipe P, pipe P traffic class TC.

In an embodiment, a unit of credit may be related to packet length. For example, a unit of credit may correspond to one byte, i.e., a greatest common divisor for a plurality of packet lengths. Thus, the number of credits utilized for the transmission of a packet of length n bytes is equal to (n+h), where h is equal to the number of framing overhead bytes per packet. Thus, packet credits corresponds to packet length plus the number of framing overhead bytes per packet. For example, frame overhead fields associated with an Ethernet frame include a preamble of length seven bytes, a start of frame delimiter (SFD) of length one byte, a frame check sequence (FCS) of length four bytes and an inter-frame gap (IFG) of length twelve bytes for a total of twenty four bytes. The Frame Check Sequence (FCS) may be considered overhead if it is not included in the mbuf packet length field.

In an embodiment, traffic shaping may be implemented at the subport and/or pipe levels. For example, scheduler module 253 may be configured to implement traffic shaping. Traffic shaping is a form of rate limiting that may delay some packets to control (i.e., limit) a rate of transmission of packets from, e.g., network device 200. The delayed packets are stored, e.g., in queues 250. The traffic shaping for subport and pipe may be implemented using a traffic shaping (TS) token bucket per subport and a TS token bucket per pipe. Each TS token bucket is implemented using, e.g., a saturated counter that is configured to maintain a count of the number of available credits. A packet may be transmitted if the number of credits in the TS token bucket is greater than or equal to the number of bytes in the packet plus the number of framing overhead bytes and not otherwise.

A token bucket may be described by two token bucket parameters. A first bucket parameter, bucket_rate, corresponds to a rate of adding credits to the bucket and has units of credits per second. A second bucket parameter, bucket_size, corresponds to a maximum number of credits that may be stored in the bucket and has units of credits. The token bucket may be initialized by setting the contents of the bucket (i.e., the number of available credits) to a predefined value, e.g., zero or one half of bucket_size. The bucket may be updated, e.g., credits may added to credits currently in the bucket, either periodically or on demand, based, at least in part, on the bucket_rate. The bucket rate (in bytes per second) may be determined as: bucket_rate=(tb_credits_per_period/tb_period)*r, where r is a port line rate (in bytes per second), as described herein. The total number of credits in the bucket may not exceed the bucket_size. Thus, additional credits that become available for addition to the bucket while the bucket is full may be dropped. Credits may be consumed in response to packet scheduling. A number of credits corresponding to packet bytes plus the framing overhead for the packet may be removed from the bucket. The packet may be sent only if enough credits are in the bucket to send the full packet (packet bytes and framing overhead for the packet).

A token bucket may be implemented using a persistent data structure. The elements of the data structure may be included in data structure 600 of FIG. 6, e.g., in subport table 602 and/or pipe table 604. The elements may include a time of the last credit update (tb_time), a time period between allowable credit updates (tb_period) measured in bytes, a credit allowance per tb_period (tb_credits_per_period) measured in bytes, the bucket size (tb_size) measured in bytes and the number of credits currently in the bucket (tb_credits) measured in bytes. Tb_time may be measured in bytes to facilitate the credit consumption operation since the current time is maintained in bytes, as described herein. An actual time interval between credit updates may include one or more tb_periods. An amount of credits available may then correspond to the number of tb_periods in the actual time interval multiplied by the tb_credits_per_period.

Token bucket operations may generally include initialization, credit update and credit consumption (e.g., on packet scheduling). Table 1 includes pseudocode illustrating an example of TS token bucket operations consistent with the present disclosure. Time corresponds to current processor time in bytes, as described herein. N_periods corresponds to the number of tb_periods in the time interval since the last credit update.

TABLE 1

```
/*Initialization*/
    tb_credits = 0; or tb_credits = tb_size / 2;
/*Credit update*/
    n_periods = (time – tb_time) / tb_period;
    tb_credits += n_periods * tb_credits_per_period;
    tb_credits = min(tb_credits, tb_size);
    tb_time += n_periods * tb_period;
/*Credit consumption*/
    pkt_credits = pkt_len + frame_overhead;
    if (tb_credits >= pkt_credits){tb_credits -= pkt_credits;}
```

As illustrated by Table 1, a TS token bucket may be initialized with either zero credits or with a number of credits corresponding to one half of the token bucket capacity. The token bucket credit update operations may occur during dequeue operations, e.g., flowcharts 900, 950. For example, the credit update operations may be initiated when a pipe is selected (i.e., is selected by one of the pipe grinders). The credit update operations may then be configured to update the respective TS token bucket credits of the pipe and subport associated with the pipe. The pipe and subport TS token bucket credits are updated at operation 910 after the pipe is selected and before the pipe and subport credits are used, (e.g., at operation 922).

In another example, the credit update operations may be triggered each time a packet is sent. In this example, the TS token bucket credit update operations may then be configured to update the credits of the subport and pipe associated with the packet. A relatively high accuracy may be achieved at cost of a computational efficiency.

In an embodiment, the TS token bucket credits may be updated after at least a full tb_period has elapsed since the last update. In this embodiment, accuracy may be traded off with speed. Full accuracy may be achieved by selecting the value for tb_period for which tb_credits_per_period=1. When less than full accuracy is acceptable, improved performance (i.e., increased speed) may be achieved by setting tb_credits_per_period to a larger value.

The TS token bucket credit consumption operations may be performed during dequeue operations (e.g., operation 924) as a result of (i.e., in response to) packet scheduling (e.g., operation 922). If the number of available TS token bucket credits (e.g., tb_credits) is less than the packet credits (i.e., packet length plus framing overhead), then the packet may not be scheduled for transmission. If the number of available TS token bucket credits is greater than or equal to the packet credits, the appropriate number of credits (e.g., corresponding to packet length plus framing overhead in bytes) may be removed from the TS token bucket when transmission is scheduled.

Thus, credit logic configured to provide traffic shaping at the subport and pipe level may be implemented utilizing TS token buckets. SLA constraints related to packet rate may be implemented by selection of bucket parameters (e.g., bucket_rate and/or bucket size).

In an embodiment, traffic classes for a selected pipe may be scheduled according to strict priority. For example, scheduler 253 may be configured to implement strict priority. Traffic classes may be characterized by, e.g., sensitivity of the associated data type to delay, jitter, out of order delivery, etc. For example, voice data may be highly sensitive to delay and/or jitter while file transfers may be minimally sensitive. Thus, voice data may correspond to a highest priority traffic class (TC 0) and best effort file transfers may correspond to a lowest priority traffic class (TC 3), for embodiments with four traffic classes (TC 0, TC 1, TC 2, TC 3)). Strict priority scheduling may thus be configured to select traffic classes in ascending order, e.g., TC 0 first and TC 3 last. Thus, for a configuration with four traffic classes and four queues per traffic class queues 0, . . . , 3 may be associated with TC 0, queues 4, . . . , 7 with TC 1, etc. Thus, queues 0, . . . , 3 may be scheduled prior to queues 4, . . . , 7 and queues 4, . . . , 7 may be scheduled prior to queues 8, . . . , 11, etc.

The traffic classes at the pipe and subport levels are not traffic shaped, so no token bucket is maintained in this context. An upper limit packet transmission rate for the traffic classes at the subport and pipe levels may be enforced by periodically refilling a subport traffic class credit counter and a pipe traffic class credit counter, out of which credits are consumed every time a packet is scheduled for that subport and pipe associated with that subport. Unlike traffic shaping, traffic class (TC) credit counter updates are performed at fixed intervals and the TC credit update sets the TC credit counter to a value. Similar to traffic shaping, TC credit counter(s) may be updated during dequeue operations, e.g., during operation 910 of FIG. 9A.

Each TC credit counter may be implemented using a persistent data structure. Elements of the data structure may include tc_time, tc_period, tc_credits_per_period and tc_credits. Tc_time, measured in bytes, corresponds to the time of the next update (i.e., refill configured to implement upper limit) for the traffic classes (TCs) of the current subport and current pipe associated with the current subport. Tc_period corresponds to the time between two consecutive updates for the TCs of the current subport and current pipe. Tc_period is generally larger than a typical value of the token bucket tb_period. For example, tc_period may be several times larger than tb_period. tc_credits_per_period corresponds to an upper limit for the number of TC credits that may be consumed by the current TC during each enforcement period, tc_period. tc_credits corresponds to a current upper limit for the number of TC credits that may be consumed by the current traffic class for the remainder of the current enforcement period.

Subport/pipe traffic class upper limit enforcement operations may generally include initialization, TC credit update and TC credit consumption (e.g., on packet scheduling). Table 2 includes pseudocode illustrating an example of subport/pipe traffic class upper limit enforcement operations consistent with the present disclosure.

TABLE 2

```
/*Initialization*/
    tc_credits = tc_credits_per_period;
    tc_time = tc_period;
/*Credit update*/
    if (time >= tc_time) {
    tc_credits = tc_credits_per_period;
    tc_time = time + tc_period;
    }
/*Credit consumption*/
    pkt_credits = pkt_len + frame_overhead;
    if (tc_credits >= pkt_credits){tc_credits -= pkt_credits;}
```

As result of packet scheduling, the selected traffic class upper limit may be decreased by a number of TC credits that corresponds to the packet length and header length in bytes. The packet may be sent if enough TC credits are currently available in the TC limit (i.e., the TC credit counter) to send the full packet credits (packet bytes and framing overhead for the packet).

Thus, traffic shaping may be implemented at the subport and the pipe levels using TS token buckets and upper limits may be enforced for each traffic class at the subport and pipe levels using TC credit counters. Credits may be updated (i.e., added) during dequeue operations when the pipe is selected by, e.g., a pipe grinder, e.g., at operation 910 of FIG. 9A. Credits may then be consumed when a packet is selected (i.e., scheduled) for transmission, e.g., at operation 924 of FIG. 9B.

In an embodiment, queues within a selected traffic class may be scheduled according to a round robin technique, e.g., at operation 913 of FIG. 9A. For example, scheduler 253 may be configured to implement the round robin techniques. The round robin may be implemented at a byte level, at a packet length-related byte level and/or may be weighted. Byte level round robin may be termed "fair queuing" and byte level weighted round robin may be termed "weighted fair queuing". The technique used is based, at least in part, on one or more characteristics of the queues in the selected traffic class, e.g., whether all the queues in the selected traffic class are active (i.e., are not empty), whether the queues are to be weighted equally and/or whether all the packets are equal (i.e., have equal length).

If all the queues in the selected traffic class are active and are to be weighted equally and all the packets are equal in length, the queues may be scheduled according to byte level round robin. For example, a next queue may be selected according to queue #i, i=(i+1) % n, where the queue index is i, % is the modulo integer remainder operator and n is the number of queues. In other words, a sequence of four queues may be selected as queue #0, queue #1, queue #2, queue #3, queue #0, etc.

If all the queues in the selected traffic class are active and are to be weighted equally but not all the packets are equal in length, the queues may be scheduled according to packet length-related byte level round robin. In this case, consuming one byte from queue #i corresponds to consuming exactly one token for queue #i. An accumulated number of tokens, T(i), previously consumed from queue #i may be maintained. Each time a packet is consumed from queue #i, T(i) is updated as: T(i)+=pkt_len. In other words, the length of the consumed packet in bytes is added to T(i). A next queue may then be selected. The next queue selected is the queue with the smallest T value.

If all the queues in the selected traffic class are active but not all of the queues are to be weighted equally and not all the packets are equal, the queues may be scheduled according to packet length-related byte level weighted round robin. Packet length-related byte level weighted round robin may be made to correspond to the packet length-related byte level round robin by utilizing a cost per byte that is different for each queue. Queues with lower weights have a higher cost per byte. In this manner, a comparison of the consumption amongst different queues in order to select the next queue may be facilitated. For example, w(i) may be defined as the weight of queue #i and t(i), may be defined as the tokens per byte for queue #i and may equal the inverse of the weight of queue #i For example, if, for four queues (i.e., i=0, 1, 2, 3), w[0 . . . 3]=[1:2:4:8], then t[0 . . . 3]=[8:4:2:1] and if w[0 . . . 3]=[1:4:15:20], then t[0 . . . 3]=[60:15:4:3]. In the second example, the inverse weights have been scaled so that the resulting tokens are integers. Consuming one byte from queue #i corresponds to consuming t(i) tokens for queue #i. T(i) is the accumulated number of tokens previously consumed from queue #i. Each time a packet is consumed from queue #i, T(i) is updated as: T(i)+=pkt_len*t(i). In other words, the product of the packet length and the number of tokens per byte is added to the accumulated number of tokens. The next queue selected may then be the queue with the smallest T value.

If not all the queues in the selected traffic class are active, not all of the queues are to be weighted equally and not all the packets are equal in length, the queues may be scheduled according to packet length-related byte level weighted round robin with variable queue status. Packet length-related byte level weighted round robin with variable queue status may be made to correspond to packet length-related byte level weighted round robin by setting the consumption of inactive queues to a high number, so that the inactive queues will not be selected by the smallest T logic.

In order to prevent T (i.e., the accumulated number of tokens for a queue) from overflowing as result of successive accumulations, T(i) may be truncated after each packet consumption for all queues. For example, T[0 . . . 3]=[1000, 1100, 1200, 1300] may be truncated to T[0 . . . 3]=[0, 100, 200, 300] by subtracting a minimum T (e.g., 1000) from T(i), i=0 . . . n.

Packet length-related byte level weighted round robin with variable queue status assumes that at least one active queue is in the set of input queues. This assumption is typically satisfied since the dequeue state machine is configured to select active queues. A saturation mask for queue #i may be defined as: mask(i)=(queue #i is active)?0: 0xFFFFFFFF, where ? is a condition operator. Thus, mask(i) is zero if queue #i is active and is 0xFFFFFFFF if queue #i is not active. Similar to packet length-related byte level weighted round robin, w(i) corresponds to the weight of queue #i, t(i) corresponds to tokens per byte for queue #i and is defined as the inverse weight of queue #i, T(i) is the accumulated numbers of tokens previously consumed from queue #i and the next queue is the queue with the smallest accumulated number of tokens previously consumed from queue #i. Prior to packet consumption from queue #i, T(i) is bit-wise OR'd with mask(i) as T(i)|=mask(i) and the value T(i) is saved as T(j), where j corresponds to the queue index. After packet consumption from queue #i, T(j) and T(i) are updated as: T(j)-=T(i), j≠i and T(i)=pkt_len*t(i). In other words, new (i.e., after packet consumption) T(j) is determined for each queue index j as the difference between the old (i.e., prior to packet consumption) T(j) and the current T(i) for queues other than the queue (i.e., queue #i) from which the packets were just consumed. The accumulated number of tokens for queue #i (i.e., T(i)) is then the product of the packet length and the tokens per byte for queue #i. Utilizing the mask(i), T(j) and updating T(j) as T(j)-=T(i), j≠i is configured to cause T(i) for inactive queues to be relatively large so that the inactive queues are not selected by the smallest T logic.

Thus, round robin may be utilized to select a next queue. The round robin may be weighted and may be implemented at the byte level and/or at the packet length-related byte level. The round robin may be configured to accommodate an inactive queue, unequal weights for at least one queue and/or packets of unequal lengths. The accumulated number of tokens T(i) may be updated during dequeue operations (e.g., operations 924) in response to packet scheduling (e.g., operation 922).

In some situations, a subport traffic class, e.g., traffic class X, may be oversubscribed by more bandwidth being allocated for traffic class X at the level of subport member pipes than is allocated for traffic class X at the parent subport level. Subport traffic class oversubscription may allow bandwidth unused by a higher priority traffic class to be used (i.e., shared) by lower priority traffic class(es). Subport traffic class oversubscription may be enabled for a selected traffic class at configuration time and is typically enabled for the lowest priority traffic class (e.g., best effort traffic). The existence of the oversubscription for a specific subport and traffic class is the result of pipe and subport level configuration as opposed to occurring due to a dynamic evolution of the traffic load at run-time (as congestion is). In operation, when the overall demand for traffic class X for the current subport is low (i.e. less than the allocation for traffic class X at the subport level), demand for traffic class X may be completely satisfied for all member pipes. However, when the aggregated demand for traffic class X for all subport member pipes exceeds the limit configured at the subport level, the demand may not be satisfied for all pipes.

In an embodiment, a system and method consistent with the present disclosure are configured to dynamically manage subport traffic class oversubscription. For example, scheduler module 253 may be configured to manage subport traffic class oversubscription. In this embodiment, each subport member pipe may be allocated an equal share of the available bandwidth at run-time for traffic class X at the subport level. Bandwidth unused by relatively low demand pipes may then be redistributed in equal portions to relatively high demand pipes. In this manner, packets belonging to traffic class X of higher demand pipes may be limited while packets belonging to traffic class X of the lower demand pipes are not affected. Further, available bandwidth may be shared and, thus, more fully utilized.

Subport traffic class oversubscription management is configured to determine a water mark (i.e., a threshold) and to periodically update the water mark based, at least in part, on the current demand experienced by the subport member pipes. The water mark may be utilized to limit the amount of traffic that each pipe is allowed to send for traffic class X. For example, traffic class X may correspond to traffic class TC3 (e.g., best effort) for a four (i.e., TC0, TC1, TC2, TC3) traffic class configuration. In this embodiment, it is assumed that the upper limit (e.g., tc_credits) for subport TC3 is set to 100% of subport rate, and the upper limit (e.g., tc_credits) for pipe TC3 is set to 100% of pipe rate for all subport member pipes.

The water mark may be determined at the subport level at the beginning of each traffic class upper limit enforcement period. The water mark may then be propagated to all subport member pipes and may be utilized by all the subport member pipes throughout the current enforcement period. Table 3 illustrates one example of water mark propagation.

TABLE 3

```
/*Initialization*/
    /*Subport level*/
    subport_period_id = 0
    /*Pipe level*/
    pipe_period_id = 0
/*Credit update*/
    /*Subport level*/
    if (time >= subport_tc_time) {
        subport_wm = water_mark_update( );
        subport_tc_time = time + subport_tc_period;
        subport_period_id ++;
    }
    /*Pipe level*/
    if (pipe_period_id != subport_period_id) {
        pipe_ov_credits = subport_wm * pipe_weight;
        pipe_period_id = subport_period_id;
    }
/*Credit consumption*/
    /*Pipe level*/
    pkt_credits = pk_len + frame_overhead;
    if (pipe_ov_credits >= pkt_credits) {
        pipe_ov_credits -= pkt_credits;
    }
```

At the beginning of the current enforcement period (which coincides with the end of the previous enforcement period), the value of the water mark may be adjusted based, at least in part, on the amount of bandwidth allocated to TC 3 at the beginning of the previous period that was left unused by the subport member pipes at the end of the previous period.

If there was subport TC3 bandwidth left unused, then the value of the water mark for the current period may be increased in order to encourage the subport member pipes to consume more bandwidth. Otherwise, the value of the water mark may be decreased to enforce equality of bandwidth consumption among subport member pipes for TC3.

The increase or decrease in the water mark value may be performed in relatively small increments, thus, an equilibrium state may be reached in a number of enforcement periods. This state may change at any time due to variations in the demand experienced by the subport member pipes for TC3, for example as result of demand increase (when water mark should be lowered) or demand decrease (when water mark should be increased).

When demand is low, the water mark may be set relatively high so that the water mark does not impede the subport member pipes from consuming more bandwidth. The highest value for the water mark may be selected as the highest rate configured for a subport member pipe. Table 4 includes one example of pseudo code that illustrates water mark operation.

TABLE 4

```
/*Initialization*/
    /*Subport level*/
    wm = WM_MAX
/*Credit update*/
    /*Subport level (water_mark_update)*/
    tc0_cons = subport_tc0_credits_per_period -
        subport_tc0_credits
    tc1_cons = subport_tc1_credits_per_period -
        subport_tc1_credits
    tc2_cons = subport_tc2_credits_per_period -
        subport_tc2_credits
    tc3_cons = subport_tc3_credits_per_period -
        subport_tc3_credits
    tc3_cons_max = subport_tc3_credits_per_period -
        (tc0_cons + tc1_cons + tc2_cons);
        if (tc3_consumption > (tc3_consumption_max - MTU)) {
            wm -= wm >> 7;
            if (wm < WM_MIN) wm = WM_MIN;
        } else {
            wm += (wm >> 7) + 1;
            if (wm > WM_MAX) wm = WM_MAX;
        }
```

Thus, subport traffic class oversubscription may be managed and unused bandwidth may be shared by lower priority traffic classes. Available bandwidth may thus be more fully utilized.

Thus, a scheduler module, e.g., scheduler 253, is configured to implement traffic management for a network device. The scheduler may include on the order of tens of thousands of queues configured to store packets associated with, for example, on the order of tens of thousands or more of traffic flows. In other words, a plurality of flows may be mapped to a queue, thus, the number of traffic flows may be greater than or equal to the number of queues. The scheduler is configured to utilize a scheduling hierarchy and associated data structure to support the traffic management operations, as described herein.

In an embodiment, network device 200 (e.g., policer module 247) may be configured to implement traffic policing. Traffic policing is generally configured to limit traffic flows to rate(s) that may be specified, for example, in an SLA. Policing may include metering, marking and/or dropping packets received by the network device 200. Policing may include single rate three color marking (srTCM) and/or two rate three color marking (trTCM) that may comply or be compatible with Request for Comments (RFC) 2697, titled A Single Rate Three Color Marker and/or RFC 2698, titled A Two Rate Three Color Marker, both published by the Internet Engineering Task Force (IETF) in September 1999. Metering is configured to determine whether a received packet is within one or more flow rate limit(s) and marking (e.g., tagging a received packet as green, yellow or red) is configured to indicate a result of the metering.

Policer module 247 is configured to implement one or more token buckets that may be used for metering. The token bucket(s) are configured to provide relatively high accuracy (e.g., at or near 1%) for relatively small bandwidth traffic flows (e.g., line rate on the order of tens of megabits per second) and for relatively high bandwidth traffic flows (e.g., line rate on the order of ones, tens or higher gigabits per second). In some embodiments, the accuracy is configurable, as described herein. The token buckets may be implemented using polling mode rather than interrupt mode and are configured to utilize a timestamp register, e.g., timestamp register 223, rather than high precision timers. The token buckets may be implemented without a hard deadline for token bucket update (e.g., without using periodic timer callbacks that can impact performance).

Generally, the srTCM technique defines two token buckets (labeled Committed and Excess) for each traffic flow, with the two buckets sharing the same token update rate. The Committed bucket may be supplied with tokens at a rate defined by a Committed Information Rate (CIR) parameter (measured in IP (Internet Protocol) packet bytes per second). The size of the Committed bucket is defined by a Committed Burst Size (CBS) parameter (measured in bytes). The Excess bucket may be supplied with tokens at the same rate as the Committed bucket. The size of the Excess bucket is defined by the Excess Burst Size (EBS) parameter (measured in bytes).

Generally, the trTCM technique defines two token buckets for each traffic flow, with the two buckets (labeled Committed and Peak) being updated with tokens at independent rates. Similar to the srTCM technique, the Committed bucket may be supplied with tokens at the rate defined by the CIR parameter and the size of the Committed bucket is defined by the CBS parameter (measured in bytes). The Peak bucket may be supplied with tokens at a rate defined by a Peak Information Rate (PR) parameter (measured in IP packet bytes per second). The size of the P bucket is defined by the Peak Burst Size (PBS) parameter (measured in bytes).

For both srTCM and trTCM, a color blind mode is functionally equivalent to a color aware mode with input color set as green. For the color aware mode, a packet with a red input color marking may be marked only with the red output color, while a packet marked with a yellow input color may be marked only with yellow or red output colors. Where appropriate, the color blind mode may be implemented distinct from the color aware mode since the color blind mode is less computationally intensive than the color aware mode.

For each input packet, the operations of the srTCM and/or trTCM techniques include updating the Committed and the Excess (for srTCM) or Peak (for trTCM) token buckets. For example, the current time may be read from the processor timestamp register, an amount of time since the last bucket update may be identified and the associated number of tokens (according to a pre-configured bucket rate) may be computed. The number of tokens in the bucket is limited by a pre-configured bucket size. The output color for the current packet may be identified based on the size of the IP packet and the amount of tokens currently available in the Committed and the Excess (srTCM) or Peak (trTCM) buckets. For color aware mode, the input color of the packet (if any) may be also considered. When the output color is not red, a number of tokens equal to the length of the IP packet are subtracted from the Committed and/or the Excess (srTCM) or the Committed and/or the Peak (trTCM), depending on the technique and the output color of the packet.

A token bucket utilized for policing consistent with the present disclosure is configured to utilize a plurality of input parameters. The input parameters include HZ, the number of processor cycles per second (i.e., processor frequency); time which corresponds to a current time and tb_rate that corresponds to traffic flow rate (in bytes per second). Time may be obtained from reading the processor time stamp counter (e.g., timestamp register 223) and, thus, is measured in processor cycles.

The token bucket(s) may utilize a persistent data structure per traffic flow. The data structure may include, e.g., tb_time, tb_tokens, tb_size, tb_period and tb_tokens_per_period. tb_time corresponds to a time of a latest update of the token bucket. tb_tokens corresponds to a number of tokens currently available in the token bucket. Typically, one token corresponds to one byte of packet data. tb_size is the upper limit for the token bucket. tb_period corresponds to a metering token bucket update period, i.e., a number of processor cycles that may elapse for each bucket update. tb_tokens_per_period corresponds to a number of tokens to add to the token bucket at each update. tb_period and tb_tokens_per_period may be utilized to achieve relatively high accuracy (e.g., on the order of 1%) for both relatively small bandwidth traffic flows and for relatively high bandwidth traffic flows.

Figure 13:
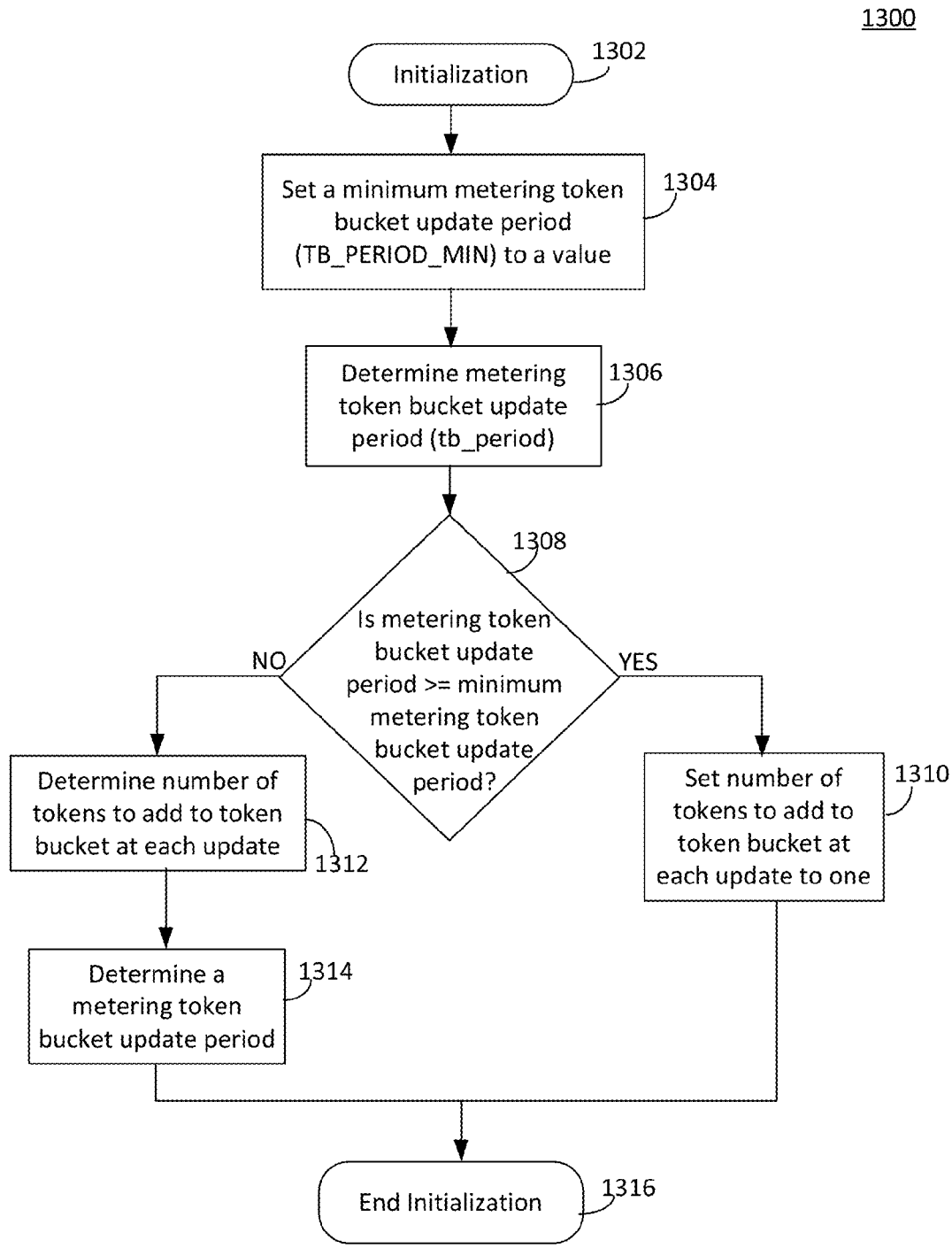
FIG. 13 illustrates a flowchart of example operations configured to initialize a token bucket consistent with an embodiment of the present disclosure.

FIG. 13 illustrates a flowchart 1300 of example operations configured to initialize a token bucket consistent with an embodiment of the present disclosure. The operations may be performed, for example, by policer module 247. Operations of flowchart 1300 begin at initialization 1302. Operation 1304 includes setting a minimum metering token bucket update period TB_PERIOD_MIN (i.e., a minimum number of processor cycles that may elapse for each bucket update) to a value. The value of TB_PERIOD_MIN is configurable related to the tolerance (i.e., desired accuracy) of the token bucket operations. For example, the TB_PERIOD_MIN may be set to one hundred, corresponding to a 1% tolerance. Operation 1306 includes determining the metering token bucket update period tb_period (i.e., the number of processor cycles that may elapse for each bucket update). tb_period may be determined as the number of processor cycles per second divided by the traffic flow rate (in bytes per second)). Thus, tb_period corresponds to processor cycle per byte of traffic.

Whether the metering token bucket update period is greater than or equal to the minimum metering token bucket update period may be determined at operation 1308. If the metering token bucket update period is greater than or equal to the minimum metering token bucket update period, then the number of tokens to add to the token bucket at each update may be set to a value of one at operation 1310. Program flow may then end at operation 1316. If the metering token bucket update period is not greater than or equal to the minimum metering token bucket update period, then the number of tokens to add to the token bucket at each update may be determined at operation 1312. A metering token bucket update period may then be determined at operation 1314. Program flow may then end at operation 1316.

Table 5 includes one example of pseudo code that illustrates initializing a token bucket consistent with an embodiment of the present disclosure. The example pseudo code of Table 5 is one example of the operations of flowchart 1300.

TABLE 5

```
/* Token bucket initialization*/
TB_PERIOD_MIN =100; /* Configurable, set to 100 for 1% tolerance */
tb_period =HZ /tb_rate; /* Floating point division */
if (tb_period >= TB_PERIOD_MIN)
        tb_tokens_per_period =1;
else {
        tb_tokens_per_period =ceil(TB_PERIOD_MIN / tb_period);
/* Round up to the next integer of floating point division result */
        tb_period =(HZ * tb_tokens_per_period) / tb_rate;
}
```

In a first example, for a network device with a processor that has a processor frequency (HZ) of 2.5 GHz (gigahertz) and a network interface configured with a line rate of 11 Mbps (megabits per second), the traffic flow rate (tb_rate) is 1.375 megabytes per second. Tb_period may then be determined as 2.5 GHz/1.375 megabytes per second=1818.18 cycles/byte. For a TB_PERIOD_MIN of 100, tb_period is greater than TB_PERIOD_MIN, thus tb_tokens_per_period may be set to one.

In a second example, with the same processor and same TB_PERIOD_MIN=100 but with a line rate of 7 Gbps, tb_rate is 0.875 gigabytes per second and tb_period is then 2.86 cycles per byte. Since tb_period is not greater than or equal to TB_PERIOD_MIN, tb_tokens_per_period is then determined as ceil (100/2.86)=ceil (34.96)=35. A new tb_period may then be determined as (HZ*tb_tokens_per_period)/tb_rate=(2.5 GHz*35)/0.875 Gbytes/sec=100. Thus, 35 tokens may be added to a token bucket for each 100 processor cycles.

The first example corresponds to a relatively low bandwidth line rate and the second example corresponds to a relatively high bandwidth line rate. Tokens are discrete, i.e., each token corresponds to one byte, and tokens may be added to a token bucket at an integer number of processor cycles (i.e., tb_period). If the processor frequency is not a whole number multiple of the traffic flow rate, the result of the division of the processor frequency by the traffic flow rate may be truncated. In the first example, truncating 1818.18 to 1818, results in a less than one percent impact on accuracy. In the second example, truncating 2.86 to 2, for example, may result in an error of approximately 30%.

The operations of flow chart 1300 and the pseudocode of Table 5 are configured to reduce an error for relatively high bandwidth flows without affecting the relatively low bandwidth flows. The overall rate that tokens are added to a token bucket (and the associated metering implemented by the token bucket) is not changed by the operations of flowchart 1300. Rather a plurality of tokens may be added at an interval that corresponds to a number of processor cycles. For example, in the second example, 100 processor cycles divided by 35 tokens (i.e., bytes) corresponds to one token each 2.86 processor cycles. A variation of ±one processor cycle corresponds to ±1% for an interval of 100 processor cycles. Thus, metering may be implemented and metering accuracy may be preserved for relatively high rate traffic flows.

Figure 14:
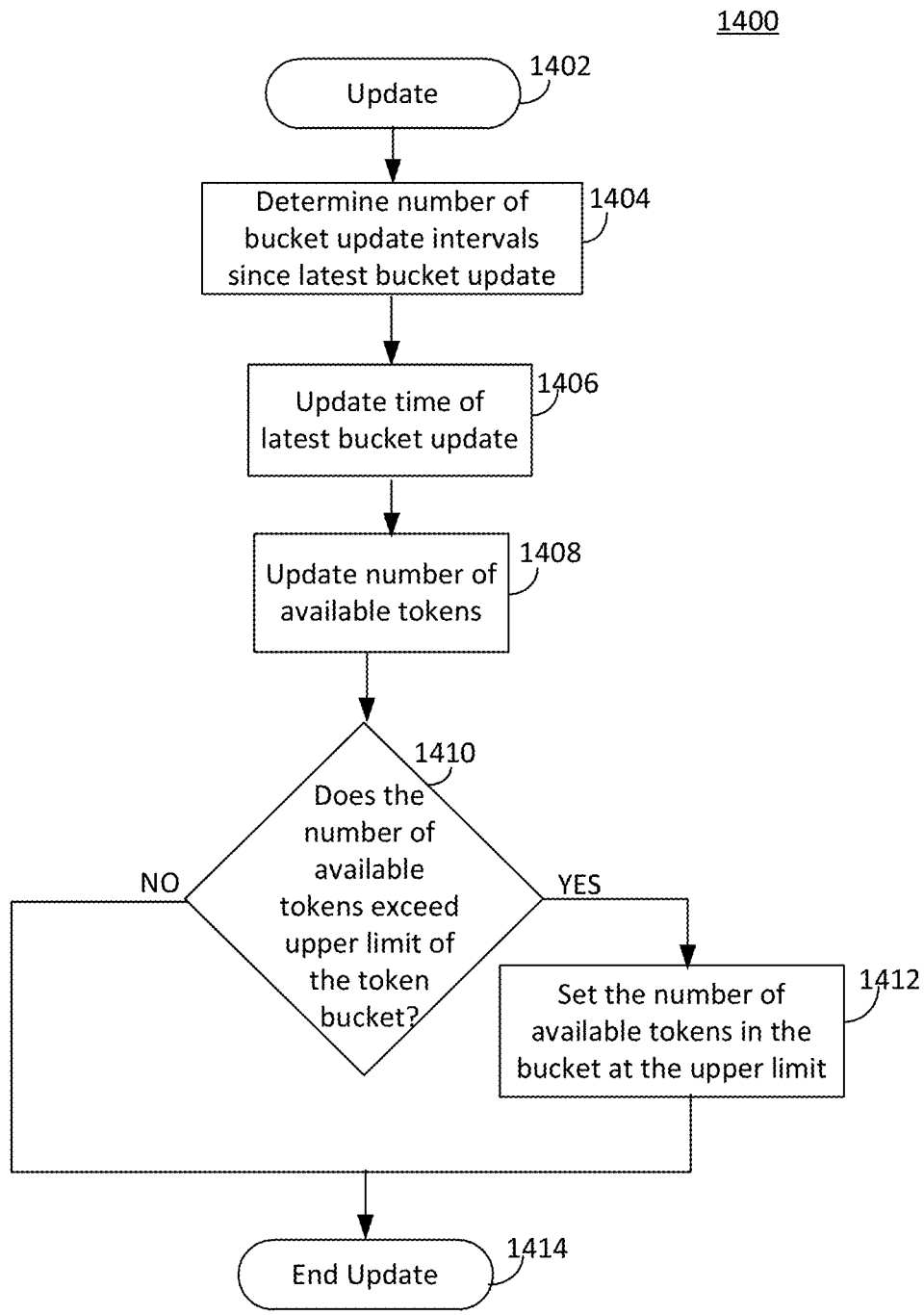
FIG. 14 illustrates a flowchart of example operations configured to update a token bucket consistent with an embodiment of the present disclosure.

FIG. 14 illustrates a flowchart 1400 of example operations configured to update a token bucket consistent with an embodiment of the present disclosure. The operations may be performed, for example, by policer module 247, in response to a new packet arrival at network device 200. Operations of flowchart 1400 begin at update 1402. A number of bucket update intervals (i.e., number of metering token bucket update periods) since latest bucket update may be determined at operation 1404. A time of a latest bucket update may be determined (i.e., updated) at operation 1406. A number of available tokens may be updated at operation 1408. For example, the number of available tokens may be updated based, at least in part, on the number of bucket update intervals since the latest bucket update and the number of tokens to add to the bucket on each update. Whether the number of available tokens exceeds the upper limit of the token bucket may be determined at operation 1410. If the number of available tokens exceeds the upper limit of the token bucket, the number of available tokens in the bucket may be set at the upper limit at operation 1412. Update may end at operation 1414.

Table 6 includes one example of pseudo code that illustrates updating (i.e., replenishing) a token bucket consistent with an embodiment of the present disclosure. The example pseudo code of Table 6 is one example of the operations of flowchart 1400.

TABLE 6

Figure 15:
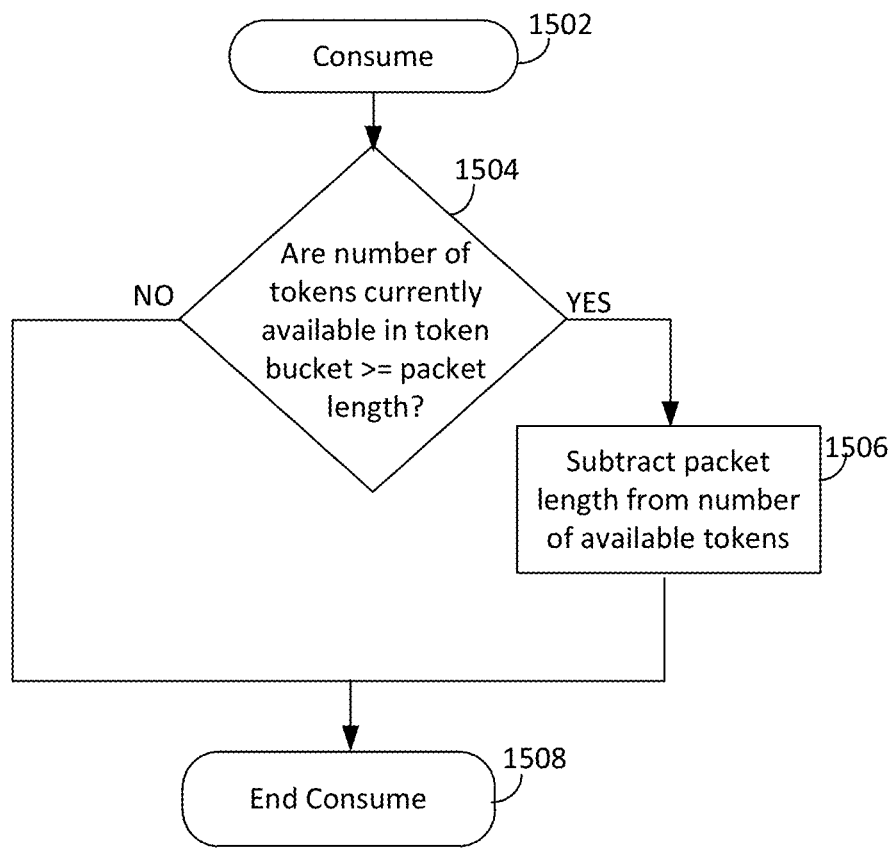
FIG. 15 illustrates a flowchart of example operations configured to consume tokens consistent with an embodiment of the present disclosure.

/* Token bucket update (replenish) run-time operation. Executed on new packet arrival*/
n_periods =(time − tb_time) / tb_period;
tb_time += n_periods * tb_period;
tb_tokens += n_periods * tb_tokens_per_period;
if (tb_tokens > tb_size)
    tb_tokens =tb_size;

FIG. 15 illustrates a flowchart 1500 of example operations configured to consume tokens consistent with an embodiment of the present disclosure. The operations may be performed, for example, by policer module 247, in response to a new packet arrival at network device 200. Operations of flowchart 1500 begin at consume 1502. Whether the number of tokens currently available in the bucket is greater than or equal to the packet length may be determined at operation 1504. If the number of tokens currently available in the bucket is greater than or equal to the packet length, then the packet length may be subtracted from the number of available tokens at operation 1506. If the number of tokens currently available in the bucket is less than the packet length, then program flow may end at operation 1508.

TABLE 7

/* Token bucket consumption run-time operation. */
/*Executed on new packet arrival, after the update operation*/
if (tb_tokens >= pkt_len)
    tb_tokens −= pkt_len;

Thus, traffic policing may be implemented using one or more token bucket(s). The token bucket(s) may be configured with a tolerance that is selectable by, e.g., a service provider. The tolerance is configured to facilitate metering and metering accuracy for both relatively high and relatively low bandwidth flows.

Figure 16A:
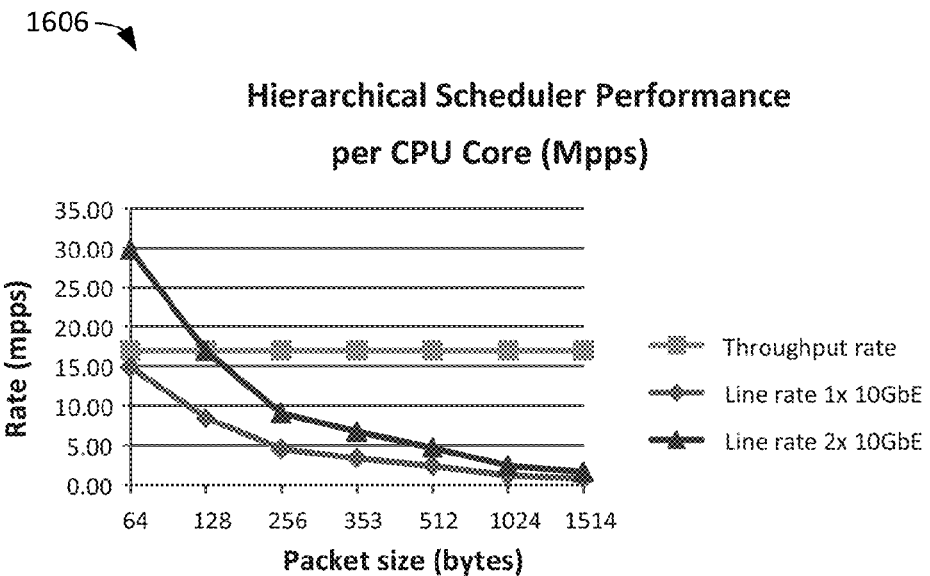
FIGS. 16A and 16B include two graphs configured to illustrate performance of an example hierarchical scheduler consistent with various embodiments of the present disclosure.
Figure 16B:
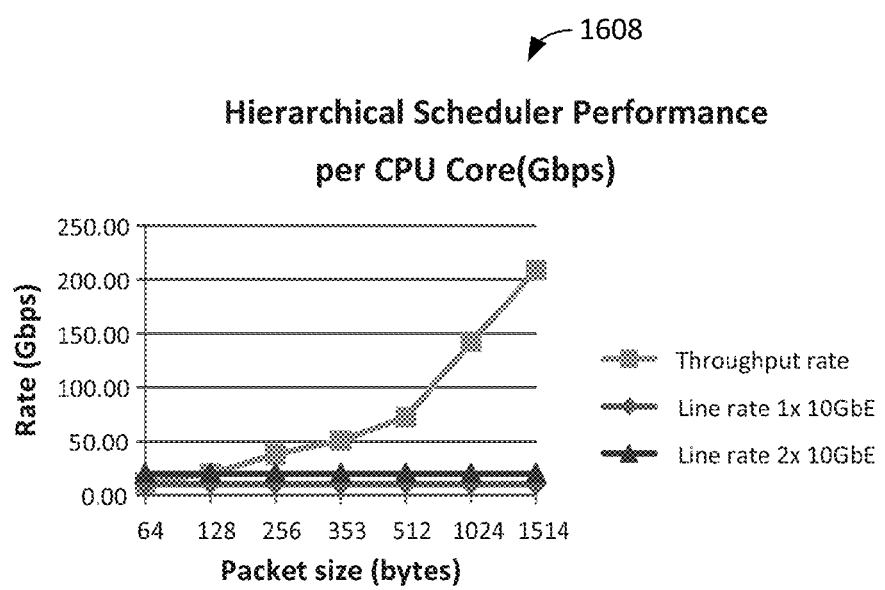

FIGS. 16A and 16B include two graphs 1606, 1608 configured to illustrate performance of an example hierarchical scheduler consistent with various embodiments of the present disclosure. The example hierarchical scheduler was implemented with 64 k active queues, traffic shaping, strict priority and weighted round robin, as described herein. The scheduler was implemented on a processor core operating at 2.7 GHz. Graphs 1606 and 1608 illustrate scheduler performance per processor core. Graph 1606 illustrates throughput rate, line rate for one 10 GbE port and line rate for two 10 GbE ports in million packets per second versus packet size in bytes. Graph 1608 illustrates the throughput rate, line rate for one 10 GbE port and line rate for two 10 GbE ports in Gigabits per second versus packet size in bytes.

While FIGS. 7, 9A, 9B, 13, 14 and 15 illustrate various operations according to an embodiment, it is to be understood that not all of the operations depicted in FIGS. 7, 9A, 9B, 13, 14 and/or 15 are necessary for other embodiments. Indeed, it is fully contemplated herein that in other embodiments of the present disclosure, the operations depicted in FIGS. 7, 9A, 9B, 13, 14 and/or 15 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) may be configured to manage system resources and control tasks that are run on, e.g., network device 200. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network.

The device memory and or network interface storage may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Embodiments of the operations described herein may be implemented in a system that includes one or more storage devices having stored thereon, individually or in combination, instructions that when executed by one or more processors perform the methods. The processors may include, for example, a processing unit and/or programmable circuitry in the network device 200 and/or other processing unit or programmable circuitry in the network interface 216. Thus, it is intended that operations according to the methods described herein may be distributed across a plurality of physical devices, such as processing structures at several different physical locations. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. "Module", as used herein, may comprise, singly or in any combination circuitry and/or code and/or instructions sets (e.g., software, firmware, etc.).

In some embodiments, a hardware description language may be used to specify circuit and/or logic implementation(s) for the various modules and/or circuitry described herein. For example, in one embodiment the hardware description language may comply or be compatible with a very high speed integrated circuits (VHSIC) hardware description language (VHDL) that may enable semiconductor fabrication of one or more circuits and/or modules described herein. The VHDL may comply or be compatible with IEEE Standard 2076-1987, IEEE Standard 2076.2, IEEE1076.1, IEEE Draft 3.0 of VHDL-2006, IEEE Draft 4.0 of VHDL-2008 and/or other versions of the IEEE VHDL standards and/or other hardware description standards.

Service provider network 102 and/or other network(s) 106 may comprise a packet switched network. Network devices 108a, . . . , 108n, other network(s) 106 and/or client systems 104a, . . . , 104n may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, network devices 108a, . . . , 108n, other network(s) 106 and/or client systems 104a, . . . , 104n may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, network devices 108a, . . . , 108n, other network(s) 106 and/or client systems 104a, . . . , 104n may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, network devices 108a, . . . , 108n, other network(s) 106 and/or client systems 104a, . . . , 104n may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Thus, a system and method consistent with the present disclosure are configured to provide programmable egress traffic management utilizing programmable network devices. The system and method are configured to distribute processing loads associated with, e.g., on the order of tens of thousands or more of packet flows across one or more processor core(s) and/or one or more thread(s). Packet processing may be pipelined. The system and method are configured to operate on a plurality of packets in parallel for enqueue operations and a plurality of pipes in parallel for dequeue operations, thus, "hiding" prefetch latencies.

The packet flows may be grouped into a scheduling hierarchy including a plurality of levels to facilitate traffic management functions. Traffic management functions implemented at one or more levels include traffic shaping, upper limit enforcement, strict priority scheduling and weighted round robin. Credit logic is utilized to implement at least some of the traffic management functionality.

Congestion management utilizing random early detection configured to intelligently drop packets may be implemented. Traffic policing may be implemented using a token bucket structure configured to provide relatively high accuracy for both relatively high bandwidth and relatively low bandwidth traffic flows.

Accordingly, the present disclosure provides an example network device. The example network device includes a processor including at least one processor core; a network interface configured to transmit and receive packets at a line rate; a memory configured to store a scheduler hierarchical data structure; and a scheduler module. The scheduler module is configured to prefetch a next active pipe structure, the next active pipe structure included in the hierarchical data structure, update credits for a current pipe and an associated subport, identify a next active traffic class within the current pipe based, at least in part, on a current pipe data structure, select a next queue associated with the identified next active traffic class, and schedule a next packet from the selected next queue for transmission by the network interface if available traffic shaping token bucket credits and available traffic class credits are greater than or equal to a next packet credits.

The present disclosure also provides an example method. The example method includes prefetching, by a scheduler module, a next active pipe structure, the next active pipe structure included in a hierarchical data structure; updating, by the scheduler module, credits for a current pipe and an associated subport; identifying, by the scheduler module, a next active traffic class within the current pipe based, at least in part, on a current pipe data structure; selecting, by the scheduler module, a next queue associated with the identified next active traffic class; and scheduling, by the scheduler module, a next packet from the selected next queue for transmission if available traffic shaping token bucket credits and available traffic class credits are greater than or equal to a next packet credits.

The present disclosure also provides an example system that includes one or more storage devices having stored thereon, individually or in combination, instructions that when executed by one or more processors result in the following operations including: prefetching a next active pipe structure, the next active pipe structure included in a hierarchical data structure; updating credits for a current pipe and an associated subport; identifying a next active traffic class within the current pipe based, at least in part, on a current pipe data structure; selecting a next queue associated with the identified next active traffic class; and scheduling a next packet from the selected next queue for transmission if available traffic shaping token bucket credits and available traffic class credits are greater than or equal to a next packet credits.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A network device, comprising:
   a processor comprising at least one processor core;
   a network interface configured to transmit and receive packets at a line rate;
   a memory configured to store a scheduler hierarchical data structure; and
   a scheduler circuitry to:
     prefetch a next active pipe structure, included in the hierarchical data structure;
     update credits for a current pipe and an associated subport;
   identify a next active traffic class within the current pipe based, at least, on a current pipe data structure;
     select a next queue associated with the identified next active traffic class; and
     schedule a next packet from the selected next queue for transmission by the network interface if available traffic shaping (TS) token bucket credits and available traffic class credits are greater than or equal to a next packet credits; and
   policer circuitry to:
     determine whether to enqueue a received packet based, at least, on a number of metering credits available in a metering token bucket;
     set a minimum metering token bucket update period based, at least, on a desired metering accuracy; and
     determine a number of metering credits to be added to the metering token bucket for each metering token bucket update period based, at least, on a processor frequency and the line rate, the metering token bucket update period greater than or equal to the minimum token bucket update period.

2. The network device of claim 1, wherein the scheduler circuitry to further identify the next active pipe based, at least, on an active queues bitmap included in the hierarchical data structure.

3. The network device of claim 1, wherein a plurality of pipes is processed in parallel.

4. The network device of claim 1, wherein updating the credits comprises at least one of adding available credits to a first TS token bucket associated with the current pipe, adding available credits to a second TS token bucket associated with the subport and resetting a credit counter associated with the identified next traffic class to an upper limit, if an elapsed time interval since a latest update is greater than or equal to a minimum time interval.

5. The network device of claim 1, wherein the next queue is selected utilizing a weighted round robin technique.

6. The network device of claim 1, further comprising a congestion to drop a received packet if an identified destination queue occupancy is above a threshold.

7. A method, comprising:
   prefetching, by a scheduler circuitry, a next active pipe structure, the next active pipe structure included in a hierarchical data structure;
   updating, by the scheduler circuitry, credits for a current pipe and an associated subport;
   identifying, by the scheduler circuitry, a next active traffic class within the current pipe based, at least, on a current pipe data structure;
   selecting, by the scheduler module, a next queue associated with the identified next active traffic class; and scheduling, by the scheduler circuitry, a next packet from the selected next queue for transmission if available traffic shaping (TS) token bucket credits and available traffic class credits are greater than or equal to a next packet credits;

determining, by policer circuitry, whether to enqueue a received packet based, at least, on a number of metering credits available in a metering token bucket;

setting, by the policer circuitry, a minimum metering token bucket update period based, at least, on a desired metering accuracy; and determining, by the policer circuitry, a number of metering credits to be added to the metering token bucket for each metering token bucket update period based, at least, on a processor frequency and a line rate, the metering token bucket update period greater than or equal to the minimum token bucket update period.

8. The method of claim 7, further comprising:
identifying, by the scheduler circuitry, the next active pipe based, at least, on an active queues bitmap included in the hierarchical data structure.

9. The method of claim 7, wherein a plurality of pipes is processed in parallel.

10. The method of claim 7, wherein updating the credits comprises at least one of adding available credits to a first TS token bucket associated with the current pipe, adding available credits to a second TS token bucket associated with the subport and resetting a credit counter associated with the identified next traffic class to an upper limit, if an elapsed time interval since a latest update is greater than or equal to a minimum time interval.

11. The method of claim 7, wherein the next queue is selected utilizing a weighted round robin technique.

12. The method of claim 7, further comprising:
dropping, by a congestion management circuit, received packet if an identified destination queue occupancy is above a threshold.

13. A storage device having stored thereon, individually or in combination, instructions that when executed by one or more processors result in the following operations comprising:

prefetching a next active pipe structure, the next active pipe structure included in a hierarchical data structure;
updating credits for a current pipe and an associated subport;
identifying a next active traffic class within the current pipe based, at least, on a current pipe data structure;
selecting a next queue associated with the identified next active traffic class; and scheduling a next packet from the selected next queue for transmission if available traffic shaping (TS) token bucket credits and available traffic class credits are greater than or equal to a next packet credits;
determining whether to etiquette a received packet based, at least, on a number of metering credits available in a metering token bucket
setting a minimum metering token bucket update period based, at least, on a desired metering accuracy; and
determining a number of metering credits to be added to the metering token bucket for each metering token bucket update period based, at least, on a processor frequency and a line rate, the metering token bucket update period greater than or equal to the minimum token bucket update period.

14. The storage device of claim 13, wherein the instructions that when executed by one or more processors results in the following additional operations comprising:
identifying the next active pipe based, at least, on an active queues bitmap included in the hierarchical data structure.

15. The storage device of claim 13, wherein a plurality of pipes is processed in parallel.

16. The storage device of claim 13, wherein updating the credits comprises at least one of adding available credits to a first TS token bucket associated with the current pipe, adding available credits to a second TS token bucket associated with the subport and resetting a credit counter associated with the identified next traffic class to an upper limit, if an elapsed time interval since a latest update is greater than or equal to a minimum time interval.

17. The storage device of claim 13, wherein the next queue is selected utilizing a weighted round robin technique.

18. The storage device of claim 13, wherein the instructions that when executed by one or more processors results in the following additional operations comprising:
dropping a received packet if an identified destination queue occupancy is above a threshold.

* * * * *